(12) United States Patent
Koyama et al.

(10) Patent No.: US 8,684,834 B2
(45) Date of Patent: Apr. 1, 2014

(54) GAME DEVICE

(75) Inventors: Nobukazu Koyama, Kanagawa (JP); William Parks, Tokyo (JP); Yasutaka Miwa, Tokyo (JP); Masaharu Sakai, Tokyo (JP); Shinichi Tanaka, Kanagawa (JP); Masaki Higuchi, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 154 days.

(21) Appl. No.: 12/672,598

(22) PCT Filed: Apr. 24, 2009

(86) PCT No.: PCT/JP2009/001905
§ 371 (c)(1),
(2), (4) Date: Jun. 2, 2010

(87) PCT Pub. No.: WO2009/153910
PCT Pub. Date: Dec. 23, 2009

(65) Prior Publication Data
US 2011/0092280 A1  Apr. 21, 2011

(30) Foreign Application Priority Data

Jun. 17, 2008 (JP) ................................ 2008-158569
Jun. 30, 2008 (JP) ................................ 2008-170189

(51) Int. Cl.
*A63F 13/00* (2006.01)
(52) U.S. Cl.
USPC ............................................. 463/29; 463/42
(58) Field of Classification Search
USPC ................................................ 463/29, 25, 42
See application file for complete search history.

(56) References Cited

U.S. PATENT DOCUMENTS 6,563,999 B1  5/2003  Suzuoki
7,670,226 B2  3/2010  Shimomura
(Continued)

FOREIGN PATENT DOCUMENTS

JP  2003058451 A  2/2003
JP  2005521541    7/2005
(Continued)

OTHER PUBLICATIONS

Atsushi, Fukumoto, "Gran Turismo: License Test Guide", dated Jan. 2, 1998. "http://www.gamefaqs.com/ps/197468-gran-turismo/faqs/3913".*

(Continued)

*Primary Examiner* — Arthur O Hall
*Assistant Examiner* — Allen Chan
(74) *Attorney, Agent, or Firm* — Matthew B. Dernier, Esq.; Gibson & Dernier LLP

(57) ABSTRACT

In a game device, a loading processor loads save data on which user ID information is attached from a storage device 80; an application executing unit executes a game program while using the loaded save data; a game requirement achievement determining unit determines whether or not a predetermined requirement of gameplay is achieved based on a progress status of the game; and item ID acquiring unit acquires an item ID associated with achieved requirement of gameplay; an item acquisition processing unit has a function for generating item acquisition information while using the acquired item ID; and a function limiting unit limits the function of an item acquisition processing unit in accordance with user ID information attached to the save data.

12 Claims, 14 Drawing Sheets

(56) References Cited

U.S. PATENT DOCUMENTS

| | | | |
|---|---|---|---|
| 7,677,970 B2 | 3/2010 | Johnson et al. | |
| 2005/0233794 A1 | 10/2005 | Cannon et al. | |
| 2006/0121990 A1 | 6/2006 | Johnson et al. | |
| 2006/0135264 A1 | 6/2006 | Shaw et al. | |
| 2006/0205487 A1 | 9/2006 | Shimomura | |
| 2007/0173321 A1* | 7/2007 | Shen et al. | 463/40 |
| 2007/0173327 A1* | 7/2007 | Kilgore et al. | 463/42 |
| 2008/0113809 A1* | 5/2008 | David et al. | 463/42 |
| 2009/0082101 A1* | 3/2009 | Ostergren et al. | 463/31 |

FOREIGN PATENT DOCUMENTS

| | | | |
|---|---|---|---|
| JP | 2006081609 A | 3/2006 |
| JP | 2006158956 A | 6/2006 |
| JP | 2006296769 A | 11/2006 |
| WO | 2005077481 A1 | 8/2005 |

OTHER PUBLICATIONS

Office Action for corresponding JP Patent Application No. 2008-158569, dated Sep. 27, 2011.
Office Action for corresponding JP Patent Application No. 2008-170189, dated Sep. 27, 2011.
International Preliminary Report on Patentability English translation for corresponding application PCT/JP2009/001905, Jan. 11, 2011.
International Preliminary Report on Patentability in Japanese for corresponding application PCT/JP2009/001905, Dec. 18, 2010.
International Search Report for corresponding application PCT/JP2009/001905, Jul. 21, 2009.
Written Opinion for corresponding application PCT/JP2009/001905, Jul. 21, 2009.
European Search Report for corresponding EP Patent Application No. 09766358, dated Jul. 3, 2012.
Japanese Office Action for corresponding JP Patent Application No. 2008-158569, dated Sep. 25, 2012.

* cited by examiner

FIG.5

| MISSION (REQUIREMENT OF GAMEPLAY) | ITEM ID |
|---|---|
| VICTORY IN AN INTERNATIONAL GRAND PRIX | 1 |
| GET FIRST PLACE WITH A HUGE LEAD | 2 |
| GET FIRST PLACE FOR ALL CLASSES | 3 |
| ⋮ | ⋮ |

FIG.6

| ITEM ID | FLAG |
|---------|------|
| 0 | 0 |
| 1 | 1 |
| 2 | 0 |
| 3 | 1 |
| ⋮ | ⋮ |

110%

110%

GAME DEVICE

FIELD OF THE INVENTION

The present invention relates to a game device that allows a user to acquire items.

BACKGROUND

Recently, a wide variety of game software has over-flooded the market, and users play and complete games one after another. Some games try to give users motivation to continue playing the game to the end of the game, by adding a twist at the ending of the game. However, still in this case, the game ends when a user sees the ending and nothing else happens. Some users do not complete a game until the end and stop the game in middle of the playing and switch to another.
[patent document No. 1] U.S. Pat. No. 6,563,999

SUMMARY OF THE INVENTION

As a strategy for giving a user motivation to continue playing, one option is to give prizes for user's achievements when the user completes a variety of missions in a game. In this case, a game system will be more fascinating if it not only gives a prize in one closed game world but if it can also present to a user a total achievement grade for variety of games or allow users to vie for the best achievement grade with each other.

In this background, a purpose of the present invention is to provide technology for allowing users to acquire items so as to improve the interest of the users in games. Another purpose of the present invention is to provide technology, in the game settings where users can acquire items, for preventing users from acquiring items fraudulently.

To address the purpose, a game device according to at least one embodiment of the present invention comprises: a loading processor operative to load save data, on which user ID (identification information) information is attached, from a storage device; an application executing unit operative to execute a game program by using the loaded save data; a game requirement achievement determining unit operative to determine whether or not a predetermined requirement of gameplay is achieved based on a status of progression of the game; an item ID acquiring unit operative to acquire an item ID associated with the achieved requirement of gameplay; an item acquisition processing unit having a function for generating item acquisition information by using the item ID acquired by the item ID acquiring unit; and a function limiting unit operative to limit the function of the item acquisition processing unit in accordance with the user ID information attached to the save data.

According to another embodiment of the present invention, an information processing apparatus is provided. The information processing apparatus comprises: an application executing unit operative to execute a game program; a game requirement achievement determining unit operative to determine whether or not a predetermined requirement of gameplay is achieved based on a progress status of the game; a playing item acquisition processing unit operative to generate item acquisition information by using an item ID (identification information) associated with the achieved requirement of gameplay; an item acquisition status examining unit operative to examine an acquisition status of items; an item acquisition determining unit operative to determine whether or not a requirement for acquiring a special item is achieved based on the examination result by the item acquisition status examining unit; a special item acquisition processing unit operative to generate item acquisition information by using an item ID associated with the special item in case the requirement for acquiring a special item is achieved; and a storage device operative to store the generated item acquisition information.

Optional combinations of the aforementioned constituting elements and implementations of the invention in the form of methods, apparatuses, systems, recording mediums, and computer programs may also be practiced as additional modes of the present invention.

BRIEF DESCRIPTION OF THE DRAWINGS

FIG. 5 shows an example of a mission table where missions and item IDs are associated with each other;

FIG. 6 shows a trophy acquisition table that indicates the relationship between the item IDs and whether or not the respective items have been acquired;

DETAILED DESCRIPTION OF THE INVENTION

First, an explanation on the general outline of the present invention will be given. In an achievement grade managing system 1 according to an exemplary embodiment of the present invention, while a user is playing a game, if he/she clears a requirement (mission) that the software of the game has set in advance, an item in accordance with the achieved requirement is given to the user by the game software. The missions are arbitrarily set by the game software, for example, to win a special race in a racing game, to beat a particular enemy character in a fighting game, or the like.

In the present exemplary embodiment, an item to be given to a user is referred to as a "trophy". There exists a plurality of types of trophies. In the present exemplary embodiment, four grades (types) of trophies are prepared, i.e., a bronze, a silver, a gold, and a platinum trophy. The Game software allocates missions for the bronze, the silver, and the gold so that the level of the challenge increases in this order. Therefore, a mission that can be easily achieved is allocated to the bronze trophy, and a challenging mission is allocated to the gold trophy. The platinum trophy does not correspond to individual missions appearing in a game. For example, if a user clears all the missions provided by the game software, system software gives the user the platinum trophy.

A user can compare trophies acquired by the user himself/herself with trophies acquired by other users via an achievement grade managing server on the network. The achievement grade managing server manages trophies acquired by users. For example, in case a user plays on a plurality of game devices, the achievement grade managing server puts trophies acquired by each game device together and synchronizes trophy acquisition information on respective game devices. Points are set for each type of trophy, and users can improve his/her level as a game player by increasing the number of acquired points.

Trophy should be acquired through the user's playing of a game, and it is not allowed to acquire a trophy fraudulently. Therefore, for example, by prohibiting a user from acquiring a trophy when he/she plays a game using data saved by another player, fairness among players can be ensured.

Figure 1:
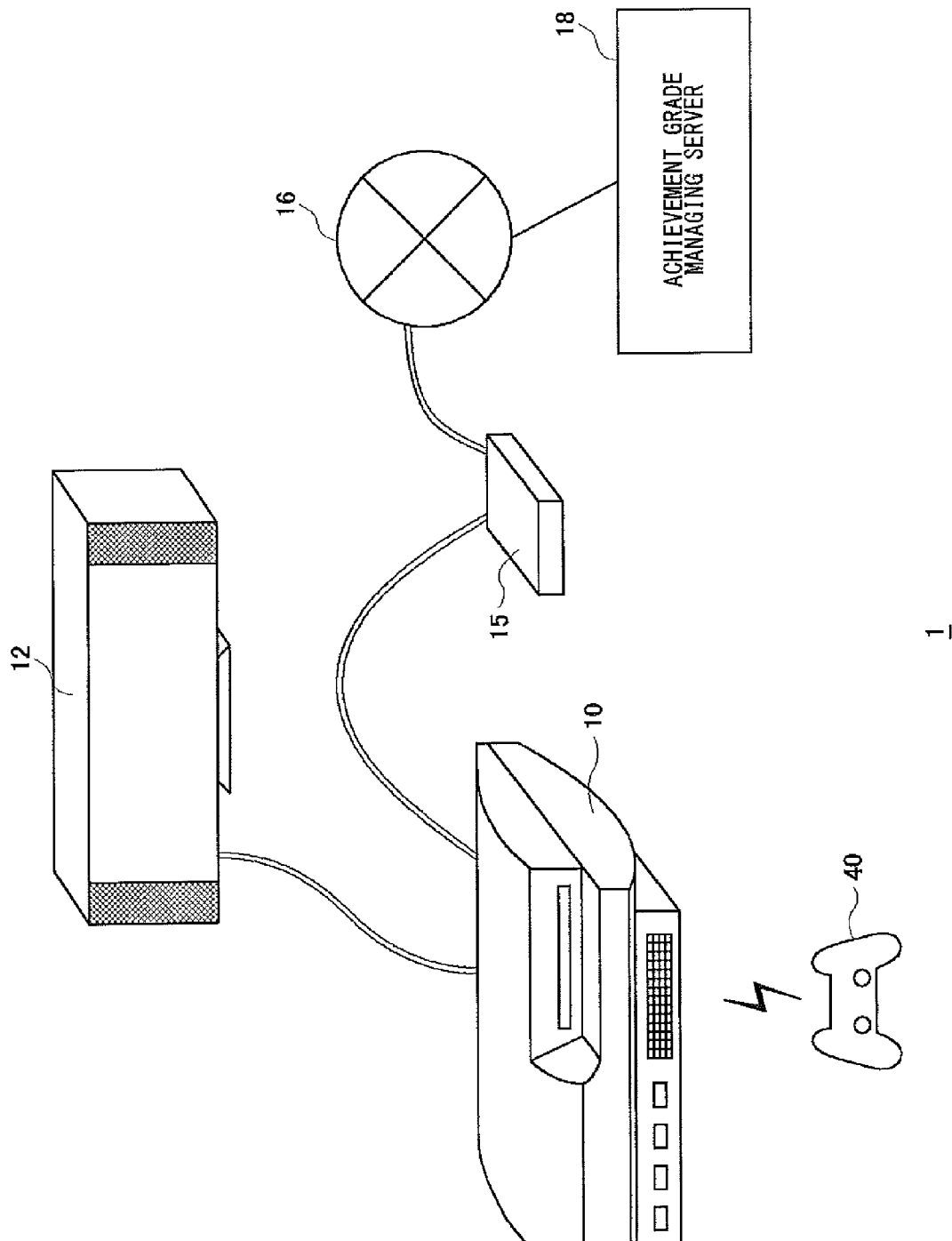
FIG. 1 shows an achievement grade managing system according to an exemplary embodiment of the present invention.

FIG. 1 shows an achievement grade managing system 1 according to an exemplary embodiment of the present invention. The achievement grade managing system 1 comprises a game controller 40, a game device 10 that executes a game program, and a display device 12 that outputs the result processed by the game device 10 as an image. The game controller 40 is an input interface device for allowing a user to input an operation into the game device 10. The game controller 40 may transmit the operation input wirelessly or may be connected with the game device 10 via a cable as an alternative use. The display device 12 may be a television provided with a speaker. The display device 12 may be connected with the game device 10 with a wire or cable or may be wirelessly connected with the game device 10 by wireless LAN (Local Area Network) or the like. The game device 10 is communicably connected, via a router 15, with an achievement grade managing server 18 connected with a network 16 so that the game device 10 can send/receive desired data. The achievement grade managing server 18 is operated by a body that manages the game achievement grades. The achievement grade managing server 18 manages the trophies that users acquire throughout playing the games.

In the achievement grade managing system 1, while a user is playing a game, if he/she clears a requirement (mission) that the game software has set in advance, an item in accordance with the achieved requirement is given to the user. Trophy acquisition information on the user is recorded in the storage device of the game device 10 as well as transmitted to the achievement grade managing server 18 and accumulated. The achievement grade managing server 18 accumulates the trophy acquisition information for each user based on the account ID of the users utilized in the network. For example, in case one user plays on a plurality of game devices 10, the achievement grade managing server 18 merges, if the account ID is same, the new trophy acquisition information with the trophy acquisition information accumulated in the past and thus aggregates the information.

Figure 2:
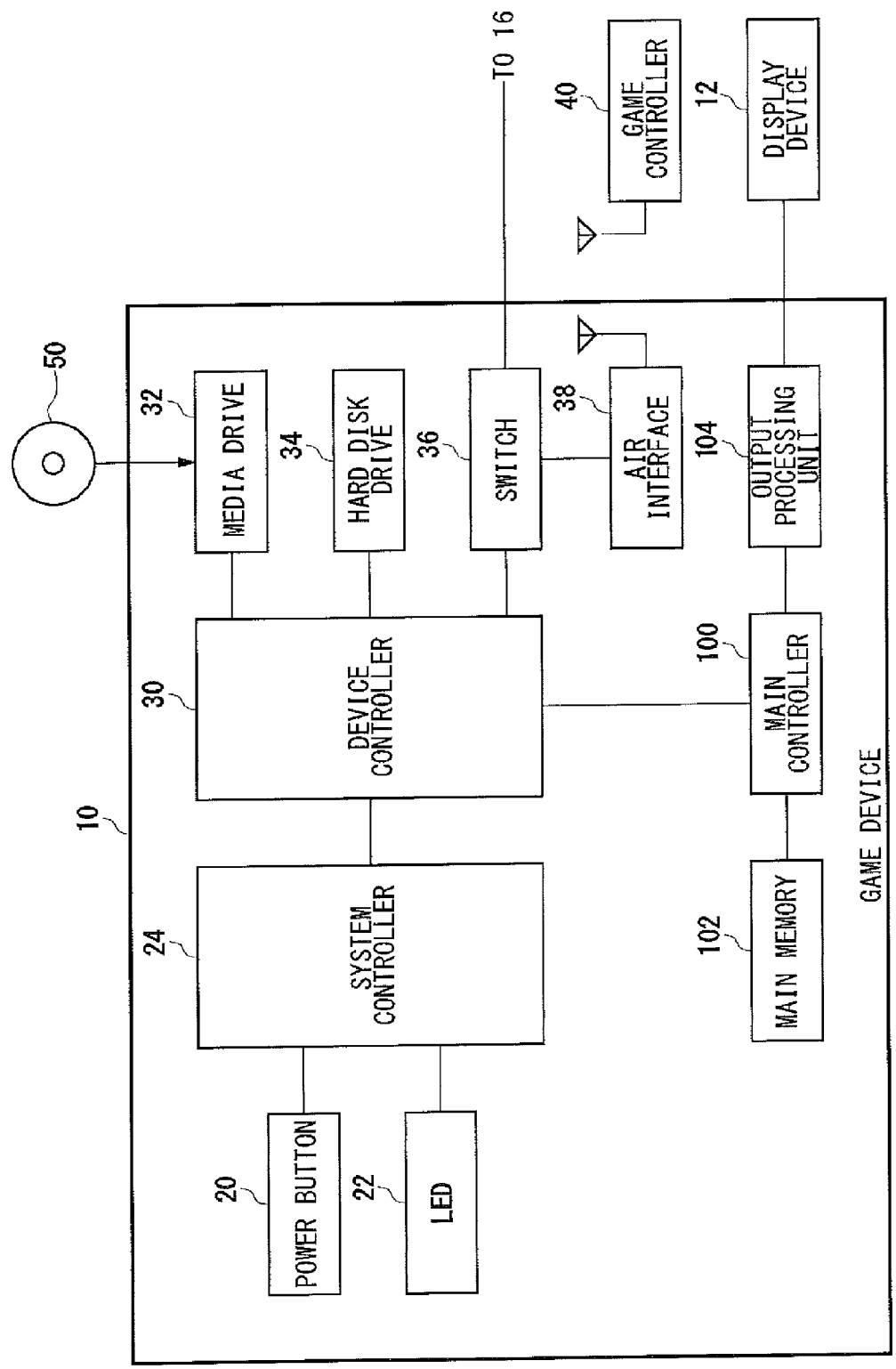
FIG. 2 shows a hardware block diagram of a game device.

FIG. 2 shows a hardware block diagram of the game device 10. The game device 10 is provided with a power button 20, an LED 22, a system controller 24, a device controller 30, a media drive 32, a hard disk drive 34, a switch 36, an air interface 38, a main controller 100, a main memory 102, and an output processing unit 104.

The power button 20 is an input unit where an operation input from a user is provided. The button is operated to turn the power of game device 10 on or off. The LED 22 is turned on or off to indicate whether the power has been turned on or off. The system controller 24 detects the pressed state or the non-pressed state of the power button 20. Upon detecting the transition from the power-off state to the pressed state, the system controller 24 activates the main controller 100, activates the boot sequence of the operating system, and turns the LED 22 on. When a power cable is connected to the game device 10, the system controller 24 maintains itself in standby mode even in the power-off state and monitors the pushing of the power button 20.

Like a south bridge, the device controller 30 is configured as an LSI (large-scale integrated circuit) for executing the delivery of information between devices. As illustrated, devices, such as the system controller 24, the media drive 32, the hard disk drive 34, the switch 36, the main controller 100, or the like, are connected to the device controller 30. The device controller 30 controls the timing of data transfer by canceling out the difference in the devices' electrical properties or the difference in data transfer rates thereof. The hard disk drive 34 drives a built-in hard disk and reads/writes data. The built-in hard disk functions as a storage device for storing data. The media drive 32 drives and recognizes, if a read-only recording medium 50 that stores game software is attached to the drive, the recording medium 50 and reads out necessary data from the recording medium 50. The recording medium 50 may be a medium such as an optical disk, a magnet optical disk, or the like.

The switch 36 is an Ethernet switch (Ethernet is trademarked) and is a device connected with external devices via a wire or wirelessly to transmit and receive data. The switch 36 sends/receives desired data such as trophy acquisition information to/from the achievement grade managing server 18 via the network 16. Further, the switch 36 is connected with the air interface 38. The air interface 38 is connected, using a communication protocol such as Bluetooth (registered trademark) protocol, the IEEE 802.11 protocol, or the like, with the game controller 40 having a wireless communication function. Information on the user's operation that is input into the game controller 40 is provided to the main controller 100 via the air interface 38, the switch 36, and the device controller 30.

The main controller 100 comprises a multi-core CPU, wherein one CPU is provided with one general-purpose processor core and a plurality of simple processor cores. The general-purpose processor core is referred to as a PPU (Power Processing Unit), and the rest of the processor cores are referred to as SPU (Synergistic-Processing Unit). In the main controller 100, an Operating System (hereinafter referred to as simply "OS") that provides the functional capability and environment for effectively using the game device 10 and for controlling the whole apparatus integrally is executed. The OS of the game device 10 according to the present exemplary embodiment is provided with three layers, that is, a user layer, a kernel layer, and a hypervisor layer, in this order from the upper layer to the lower layer. Software of the user layer, the kernel layer, and the hypervisor layer integrally functions as the "OS" of the game device 10.

Upon activating the power by using the power button 20, the system controller 24 provides power to the main controller 100 and the output processing unit 104 via the device controller 30. After power is provided to the main controller 100, the PPU first executes the boot loader of the OS so as to activate the hypervisor layer. Subsequently, the PPU activates the kernel layer of the OS and activates the user layer accordingly, so as to prepare for the receiving of data provided from the hard disk drive 34 or from the recording medium 50. This allows the main controller 100 to execute a game program.

The main controller 100 comprises a memory controller connected to the main memory 102. The PPU is provided with a register and comprises a main processor as the main body for executing calculation. The PPU efficiently allocates tasks, as a basic unit of processing in an application to be executed, to respective SPUs. The PPU may execute a task by itself. The SPU is provided with a register and comprises a sub processor as the main body for executing calculations and local memory as local storage. The main memory 102 and the local memory are provided as RAM (random access memory). The SPU is provided with a DMA (Direct Memory Access) controller as a controlling unit for its exclusive use. By transmitting data between the main memory 102 and the local memory, the SPU can process stream data at a high speed and can implement high-speed data transmission between the frame memory built in the output processing unit 104 and the local memory.

The output processing unit 104 is connected with the display device 12 and outputs image signals and sound signals that are the processing results of the application. The output processing unit 104 comprises a GPU (Graphics Processing Unit) that implements an image processing function. The GPU adopts HDMI (High Definition Multimedia Interface) and can output image signals in digital form.

In the game device 10 according to the present exemplary embodiment, the game software detects that a requirement is achieved depending on the requirements that are predetermined by the game software and required of gameplay and depending on the progress of the game played by a user. Then the game software calls an item management utility installed in the game device 10 and gives the user an item (trophy).

More specifically, on the hard disk drive 34 of the game device 10, a trophy acquisition table is prepared beforehand, the table indicating all of the trophy IDs provided by the game software and the acquired flag values, showing whether or not each trophy is acquired. In the default state, the acquired flag values are set to zero. The game software provides the item management utility with a trophy ID that corresponds to the achieved requirement, and then the item management utility sets the acquired flag value of the corresponding trophy ID to "1". The trophy ID of which the acquired flag value is set to "1" constitutes the trophy acquisition information. Through this process, every time the game software detects the achievement of one of the pre-set requirements, the trophy acquisition table is updated, and the volume of the trophy acquisition information is thereby increased.

If a user retains an account ID on the network, the item management utility transmits trophy acquisition information to the achievement grade managing server 18. The achievement grade managing server 18 merges the new trophy acquisition information with the trophy acquisition information accumulated in the past, based on the user's account ID, and reserves the information.

Figure 3:
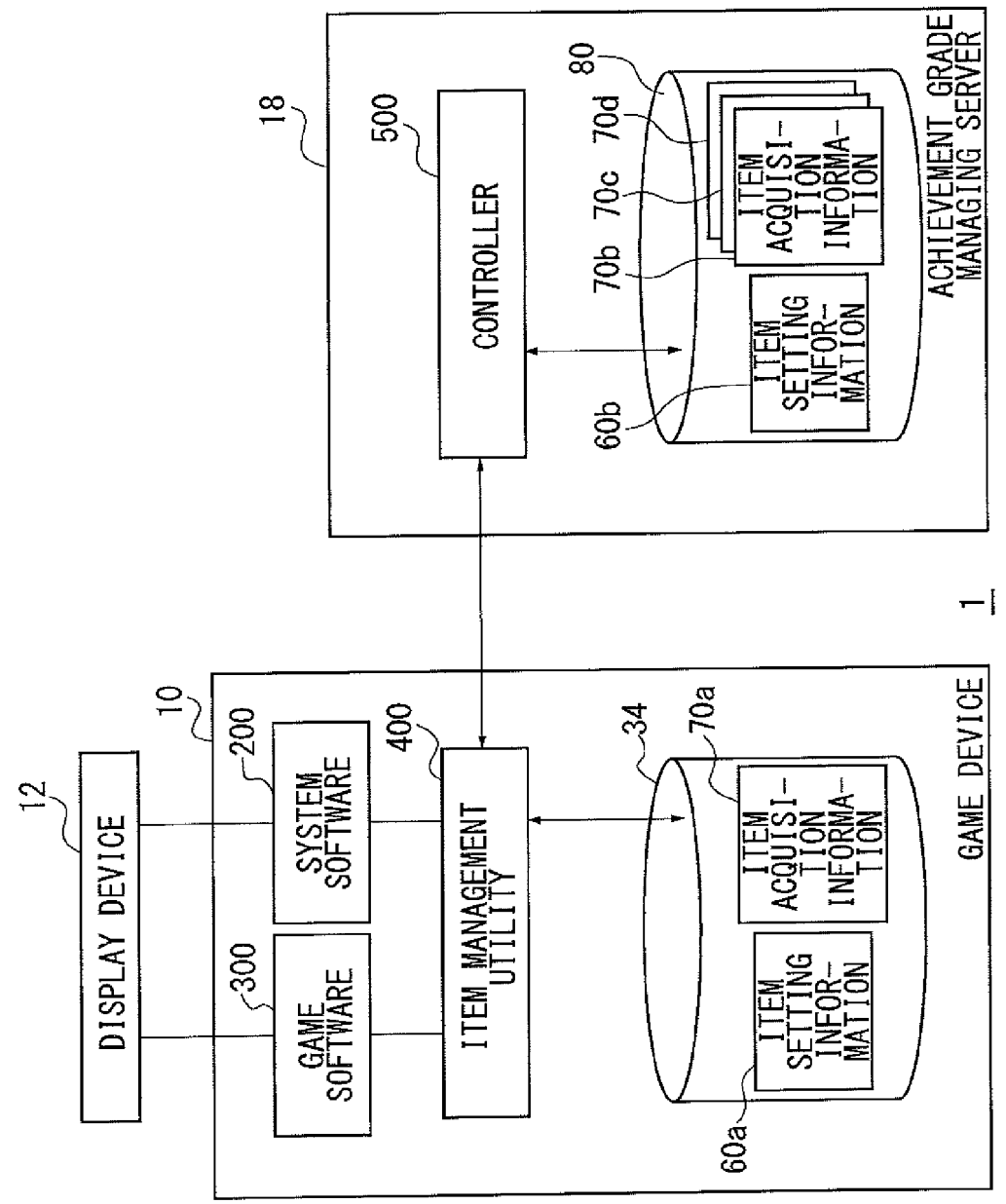
FIG. 3 shows a functional block diagram of the achievement grade managing system that executes the process for managing items (trophies)

FIG. 3 shows a functional block diagram of the achievement grade managing system 1 that executes the process for managing the items (trophies). The game device 10 executes system software 200, game software 300, and item management utility software 400 (hereinafter referred to as an "item management utility 400"). The system software 200 is an operating system (OS) and has the functional capability for performing a display process or the like in the game device 10. The item management utility 400 provides the functional capability for allowing the game software 300 to use the achievement grade managing system 1. The game software 300 executes, while utilizing the functions of the item management utility 400, the process of installing item setting information 60a, the process of generating item acquisition information 70a, and the process of acquiring item setting information 60b and item acquisition information 70b from the achievement grade managing server 18.

The achievement grade managing server 18 comprises a controller 500 and a storage device 80. In the storage device 80, the latest item setting information 60b and item acquisition information 70b, 70c, and 70d for a plurality of users who have registered with the achievement grade managing system 1 are retained. In the following, it is assumed that the item acquisition information 70b is the item acquisition information of a user of the game device 10, and the set of item acquisition information 70c and 70d is the item acquisition information of other users.

The game software 300 calls a "trophy registering function" from the item management utility 400 when the game software 300 is started. Then item setting information 60 is fetched from a predetermined file (hereinafter referred to as an "item file") included in game software, which is stored on the recording medium 50 or stored on the hard disk drive 34, and the item setting information 60 is installed on the hard disk drive 34, accordingly. This puts the game software 300 in a mode where trophies can be acquired. This installation process needs to be executed once, and thus this process is executed when the game software 300 is started for the first time.

In this process, if a user has signed in a service provided by the achievement grade managing system 1, the game software 300 checks the item acquisition information 70b that is, in the achievement grade managing server 18, associated with the account ID of the user. If the item acquisition information 70b in the achievement grade managing server 18 includes another trophy besides the trophy identified by the item acquisition information 70a retained on the hard disk drive 34, the trophy registering function acquires the item acquisition information 70b and stores the additional information on the hard disk drive 34, accordingly. This enables the synchronization of the game device 10 and the achievement grade managing server 18. In this process, by allowing the trophy registering function to acquire the difference between the item acquisition information 70a and the item acquisition information 70b, the volume of data to be transmitted can be reduced. Further, in case the item setting information 60b in the achievement grade managing server 18 is performing the latest update, the game software 300 acquires the item setting information 60b and stores the information 60b on the hard disk drive 34 while overwriting the old information.

The item setting information 60 includes attributes, such as, images representing respective trophies (trophy images), the name and the explanation text for respective trophies, or the like. The item setting information 60 may be updated so as to increase the number of trophies. Therefore, the trophy registering function of the item management utility 400 has a functional capability for checking whether the item setting information 60 in the achievement grade managing server 18 has been updated. The item setting information 60 is stored in one item file and included in game software stored in the recording medium 50 or stored on the hard disk drive 34. One trophy has attributes illustrated below.

(1) Trophy ID
An ID for identifying the trophy.
(2) Name/Detailed Information
The name of the trophy and explanation regarding the trophy.
(3) Grade (Type)
One grade of either bronze/silver/gold/platinum
(4) Platinum Link
Whether the acquisition of the trophy is included in the requirement for acquiring a platinum trophy.

In case the item setting information 60 includes a plurality of trophies, the number of the attributes from (1) to (4) as indicated above and the number of trophy images to be set in the item setting information 60 are equal to the number of the trophies.

The system software 200 generates a display screen to be displayed on the display device 12 while utilizing a GUI (Graphical User Interface) and while using the item setting information 60a and the item acquisition information 70a provided by the item management utility 400. For example, the system software 200 generates a screen indicating the status of the acquired trophies, etc.

A detailed explanation on the game device 10 will be given below.

Figure 4:
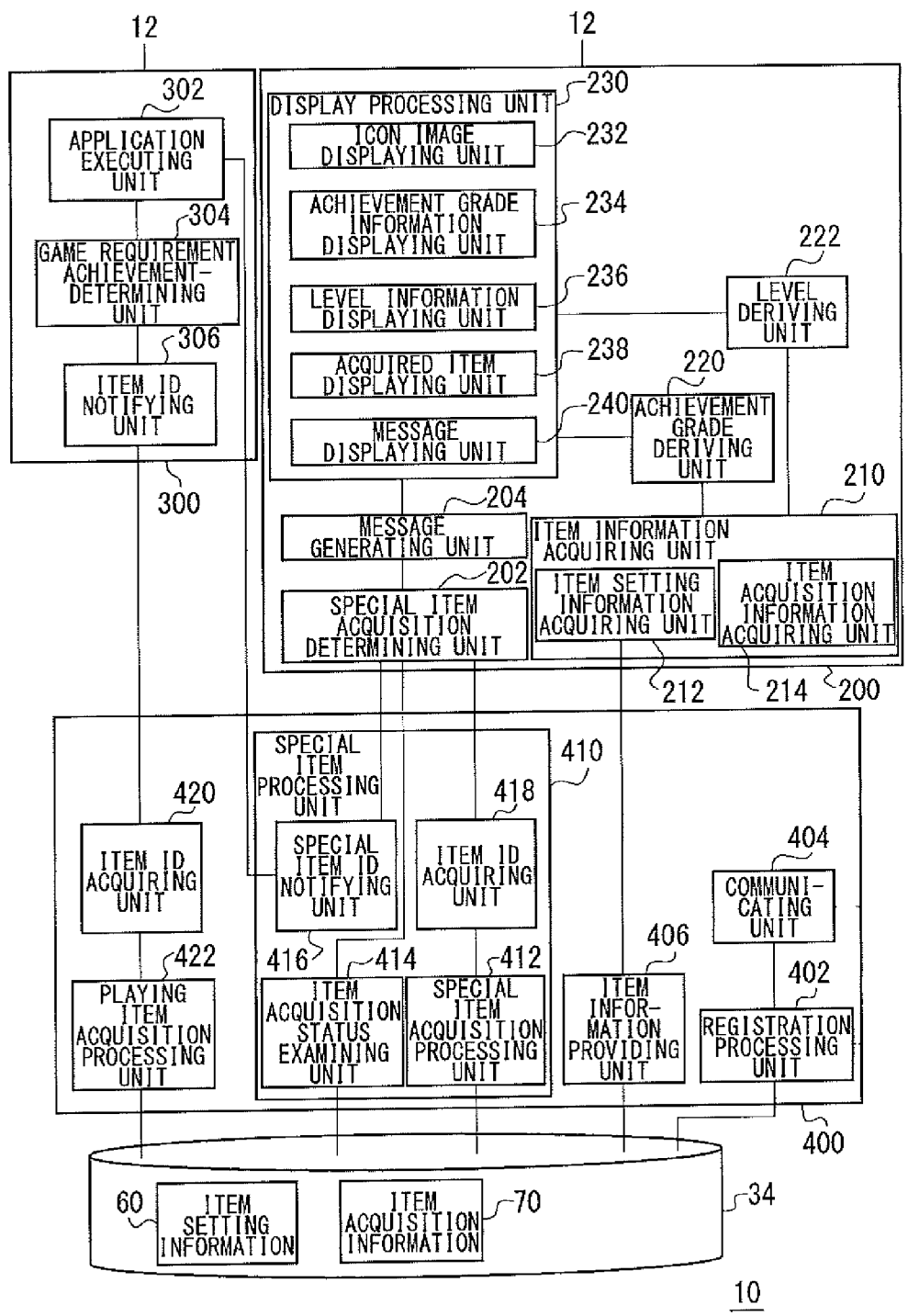
FIG. 4 shows a detailed structure of the game device illustrated in FIG. 3.

FIG. 4 shows a detailed structure of the game device 10 illustrated in FIG. 3. The game device 10 executes the system software 200, the game software 300, and the item management utility 400.

The system software 200 operates as an Operations System (OS) and comprises a special item acquisition determining unit 202, a message generating unit 204, an item information acquiring unit 210, an achievement grade deriving unit 220, a level deriving unit 222, and a display processing unit 230. The item information acquiring unit 210 is provided with an item setting information acquiring unit 212 and an item acquisition information acquiring unit 214. The display processing unit 230 is provided with an icon image displaying unit 232, an achievement grade information displaying unit 234, a level information displaying unit 236, an acquired item displaying unit 238, and a message displaying unit 240.

The item management utility 400 comprises a registration processing unit 402, a communicating unit 404, an item information providing unit 406, a special item processing unit 410, an item ID acquiring unit 420, and a playing item acquisition processing unit 422. The special item processing unit 410 is provided with a special item acquisition processing unit 412, an item acquisition status examining unit 414, a special item ID notifying unit 416, and an item ID acquiring unit 418. The game software 300 comprises an application executing unit 302, a game requirement achievement-determining unit 304, and an item ID notifying unit 306.

The elements depicted in FIG. 4 as functional blocks for performing various processes are implemented in the hardware by CPUs (Central Processing Unit), memory, or other LSI's, and in software by programs, etc., loaded into the memory. As mentioned before, the main controller 100 is provided with a single PPU and a plurality of SPUs. The PPU and the SPUs can form functional blocks either alone or in combination. Therefore, it will be obvious to those skilled in the art that the functional blocks may be implemented in a variety of manners by hardware only, software only, or a combination thereof. In the following, an explanation on the process for acquiring trophies will be given first, and subsequently, an explanation on the process for displaying the acquired trophies will be given.

<Process for Acquiring Trophies>

First, the registration processing unit 402 fetches the item setting information 60 from the item file included in the game software stored in the recording medium 50 or stored on the hard disk drive 34 and installed the information 60 on the hard disk drive 34. This enables the start of the process for acquiring trophies.

In the game software 300, the application executing unit 302 receives the user's operation that is input into the game controller 40 and executes the game program. In the present exemplary embodiment, the game software sets requirements of gameplay for obtaining a trophy. These requirements are referred to as "missions," which may be open to the users or may remain unpublicized. The game software is provided with a table where each mission is associated with the ID of a trophy (item ID) to be given to a user when the mission is completed. FIG. 5 shows an example of a mission table where missions and item IDs are associated with each other.

The game requirement achievement-determining unit 304 monitors the progress of the game and determines whether or not a mission (i.e., one of the requirements of gameplay, the requirements being predetermined for each game) is completed. If the game requirement achievement-determining unit 304 determines that the mission is completed, the game requirement achievement-determining unit 304 acquires an item ID associated with the completed mission from the mission table. The item ID notifying unit 306 notifies the item management utility 400 of the acquired item ID.

In the item management utility 400, the item ID acquiring unit 420 acquires the conveyed item ID and passes the ID to the playing item acquisition processing unit 422. The playing item acquisition processing unit 422 generates item acquisition information 70 by using the item ID. The item acquisition information 70 is information indicating that an item has been acquired. More specifically, the item acquisition information 70 is information that will be illustrated below.

Figure 6:
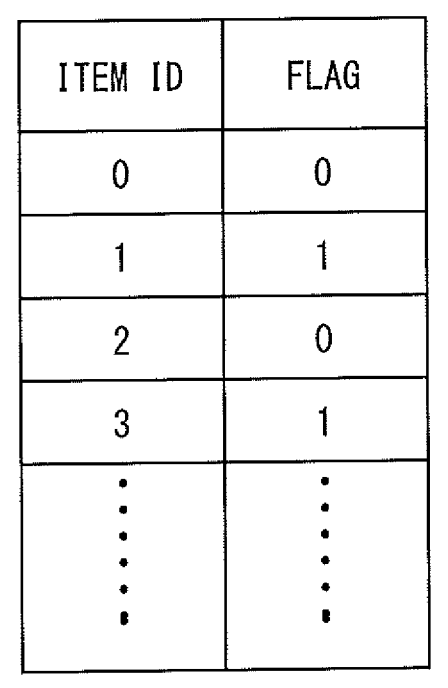

FIG. 6 shows a trophy acquisition table that indicates the relationship between the item IDs and whether or not the respective items have been acquired. For items that have not yet been acquired, the acquisition flag value is set to zero. In the default status, all the acquisition flag values are set to zero. If a mission is completed, the acquisition flag value of an item ID corresponding to the mission is set to "1". More specifically, the playing item acquisition processing unit 422 receives an item ID from the item ID acquiring unit 420 and then sets the acquisition flag value associated with the item ID to "1". In this manner, the item acquisition information 70 is information composed of the combination of item IDs and acquired flag values.

The items on which the playing item acquisition processing unit 422 executes the process of acquisition are trophies of three types, that is, bronze, silver, and gold, where the platinum-type trophy is not included. The item ID of a platinum trophy is "0", while the value "1" or greater than "1" is allocated as the item ID of the bronze, the silver, or the gold. In this manner, the game software 300 can give a user three types of trophies, that is, the bronze, the silver, and the gold. On the other hand, a platinum trophy is given to a user by the system software 200.

After the playing item acquisition processing unit 422 performs the process of acquiring an item, the special item acquisition determining unit 202 allows the item acquisition status examining unit 414 to examine the acquisition status of items. The item acquisition status examining unit 414 refers to the item setting information 60 and the item acquisition information 70 so as to examine the acquisition status of items and then notifies the special item acquisition determining unit 202 of the status.

As described above, for each trophy, information on the "platinum link" is set as an attribute, and the information on the platinum link is set as a flag value, where the flag value "1" means that the acquisition of that trophy is included in the requirement for acquiring a platinum trophy and the flag value 0 means that the acquisition of that trophy is not included in the requirement for acquiring a platinum trophy. The item setting information 60 is updated in case an item is added. However, in the default item setting information 60, the flag values of the platinum links for all the items may be set to "1", and the flag values for additional items may be set to 0.

The item acquisition status examining unit 414 refers to the item setting information 60 and extracts an item ID for which the flag value of the platinum link (hereinafter referred to as platinum flag value) is set to "1". Subsequently, the item acquisition status examining unit 414 refers to the trophy acquisition table and examines whether the acquired flag values of each of the extracted item IDs are "1".

If there is an item that has "1" as the platinum flag value and has not been acquired, the item acquisition status examining unit 414 notifies the special item acquisition determining unit 202, accordingly. Upon receiving the notification, the special item acquisition determining unit 202 determines that the item acquisition requirement for acquiring special item, i.e., a platinum trophy, has not been achieved.

On the other hand, if all the items for which the platinum link is set have been acquired, the item acquisition status examining unit 414 notifies the special item acquisition determining unit 202 of the examination result, and the special item acquisition determining unit 202 determines that the item acquisition requirement is achieved.

The function for the examination performed by the item acquisition status examining unit 414 may be retained by the special item acquisition determining unit 202. In this case, the special item acquisition determining unit 202 is provided with both the item setting information 60 and the item acquisition information 70 from the item information providing unit 406 and examines the acquisition status of the items.

In case the requirement for acquiring a platinum trophy is achieved, the special item acquisition determining unit 202 notifies the item ID acquiring unit 418 of the item ID of the platinum trophy. This ID value is 0. The item ID acquiring unit 418 acquires the conveyed item ID and passes the ID to the special item acquisition processing unit 412. The special item acquisition processing unit 412 uses the item ID and generates item acquisition information 70. More specifically, the special item acquisition processing unit 412 sets "1" as the acquisition flag value of the item having the item ID 0 in the trophy acquisition table.

In this process, the special item acquisition determining unit 202 gives an instruction to the special item ID notifying unit 416 for notifying the game software 300 of the item ID 0. The special item ID notifying unit 416 notifies the game software 300 of the item ID 0 for the platinum trophy. Upon receiving the notification, the application executing unit 302 may display a message indicating that a platinum trophy is acquired on the game screen.

Alternatively, the system software 200 may display this message on the game screen. If the requirement for obtaining a platinum trophy is achieved, the message generating unit 204 receives an instruction from the special item acquisition determining unit 202 and generates a message relating to the acquisition of the platinum trophy. The message displaying unit 240 displays the generated message so that the message overlaps a predetermined region on the screen of the game being played. This enables a user to surely have an opportunity to see the message because, even in the case where the game software 300 does not display a message regarding the acquisition of the platinum trophy, the system software 200 displays the message over the game screen.

In this manner, in the game device 10, the game software 300 grants a user a trophy of bronze, silver, and/or gold, and as a result of the user's acquisition of the trophies of bronze, silver, and/or gold, the system software 200 grants a user a platinum trophy. This adds a premium to the acquisition of platinum trophies. By allowing the system software 200 to perform the process of acquiring a platinum trophy, the processing burden of the game software 300 can be lightened and also the burden accompanying the development of the game can be lightened for the game developers.

<Process for Displaying Trophies>

After receiving the request for displaying trophies from a user, the item information providing unit 406 reads the item information, including the item setting information 60 and the item acquisition information 70, from the hard disk drive 34 and provides the information to the item information acquiring unit 210. The item setting information acquiring unit 212 acquires the item setting information 60, and the item acquisition information acquiring unit 214 acquires the item acquisition information 70.

The achievement grade deriving unit 220 calculates the points using the item acquisition information 70 and the item setting information 60 and then derives the achievement grade for the game based on the calculated points. Four types of the trophies are provided, that is, the bronze, the silver, the gold, and the platinum. For respective types, points are set as follows:

Bronze: 10 points
Silver: 30 points
Gold: 100 points
Platinum: 200 points.

In the default item setting information 60, the types and the numbers of trophies are allocated so that the sum total of points for all the trophies become around 1,000 points. This is for the assurance of fairness among the games when deriving user levels, which will be described later. A point setting table that describes the relationship above is retained on the hard disk drive 34. The achievement grade deriving unit 220 acquires the point setting table via the item information providing unit 406.

The achievement grade deriving unit 220 extracts the number of each type of trophy included in the item setting information 60 and calculates the total points. For example, in case there are twenty bronze trophies, ten silver trophies, three gold trophies, and one platinum trophy, the total points will be 1000 (=20 multiplied by 10+10 multiplied by 30+3 multiplied by 100+1 multiplied by 200). Next, the achievement grade deriving unit 220 extracts the number of each type of acquired trophy included in the item acquisition information 70 and calculates the acquired points, accordingly. For example, there are sixteen bronze trophies, eight silver trophies, two gold trophies, and zero platinum trophies, and the acquired points will be 600 (=16 multiplied by 10+8 multiplied by 30+2 multiplied by 100) points. The achievement grade deriving unit 220 calculates the achievement grade of the game by multiplying 100 by the acquired points divided by the total points (100(acquired points/total points)). In this example, the achievement grade deriving unit 220 derives the achievement grade as 60 percent.

By deriving the achievement grade of the game by multiplying 100 by the acquired points divided by the total points (100(acquired points/total points)), the achievement grade deriving unit 220 can derive the achievement grade while taking the difficulty level of the missions into consideration. For example, if the achievement grade of the game is represented by the acquired points, since the total number of points is not considered, the achievement grade is not properly represented. Alternatively, if the achievement grade of the game is represented by the number of acquired trophies, it cannot be an accurate achievement grade since the level of difficulty is not considered. In this fashion, the achievement grade deriving unit 220 can derive the achievement grade objectively.

The derived achievement grade is sent to the achievement grade information displaying unit 234. The achievement grade information displaying unit 234 displays the derived achievement grade on the display device 12.

In case the item setting information 60 and the item acquisition information 70 are stored on the hard disk drive 34 for a plurality of games, the achievement grade deriving unit 220 derives achievement grades for the plurality of games. This allows the achievement grade information displaying unit 234 to display achievement grades for the plurality of games on the display device 12.

Figure 7:
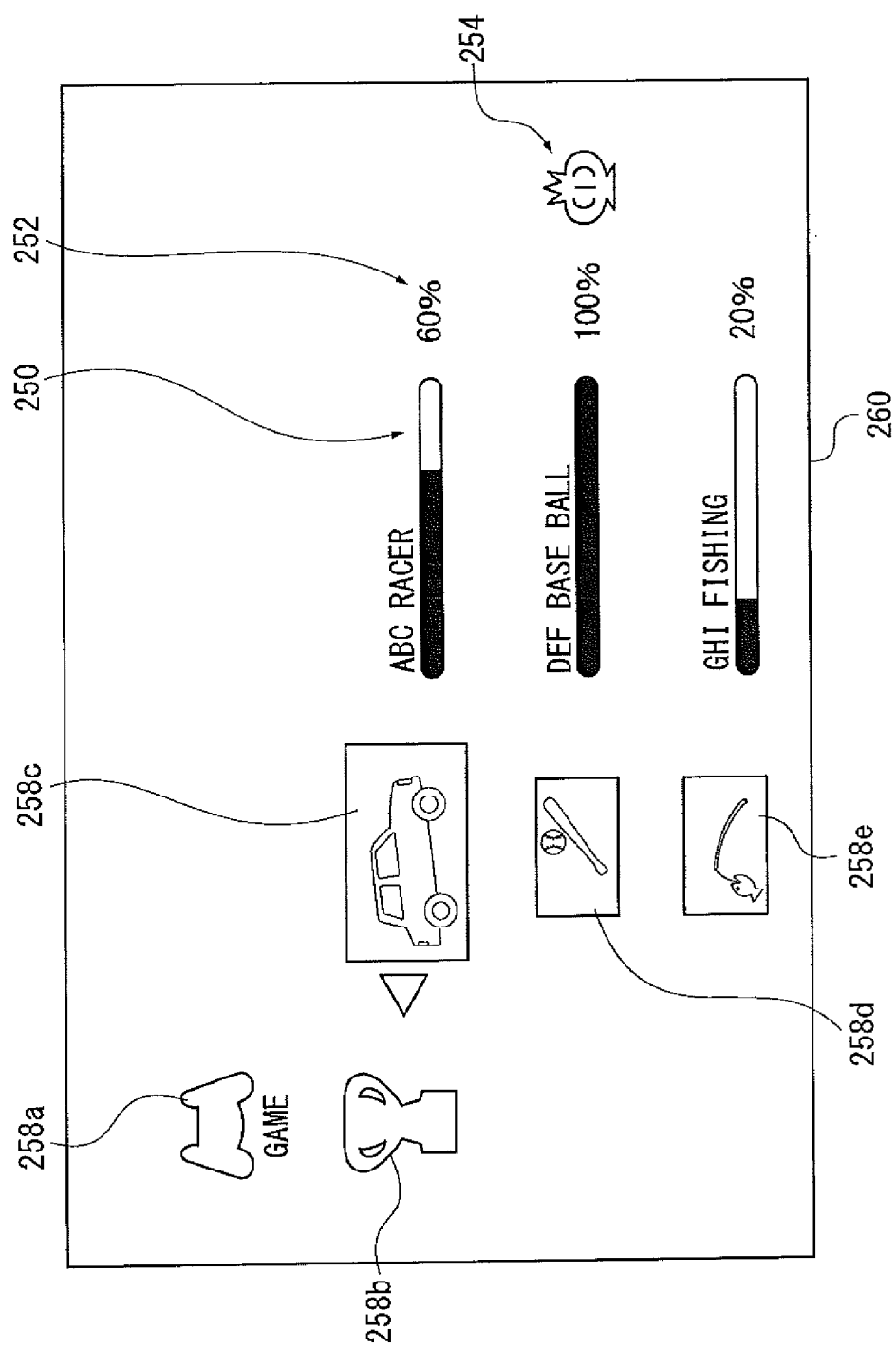
FIG. 7 shows an exemplary screen representing the achievement grade of a game.

FIG. 7 shows an exemplary screen representing the achievement grade of a game. On the achievement grade displaying screen 260, the achievement grades of the games are represented by an achievement grade indicator 250 and an achievement grade value 252. The achievement grade displaying screen 260 is generated by the display processing unit 230.

The icon image displaying unit 232 disposes icon images 258a-258e on the achievement grade displaying screen 260. The icon images 258a and 258b are images provided by the system software 200 and the icon images 258c, 258d, and 258e are images extracted from the item setting information 60. In the region located below the level of the icon image 258b, where icon images 258c, 258d, and 258e are displayed, the icon images 258 of the games that a user has played and has acquired a trophy in the past are displayed. On the left sides of the icon images 258c, 258d, and 258e, the game titles are displayed, respectively. Under the game titles, the achievement grade indicators 250 are displayed, respectively. Further, on the right sides of the indicators, the achievement grade values 252 are displayed, respectively. On the achievement grade displaying screen 260, an achievement grade indicator 250 and an achievement grade value 252 are displayed for each of the plurality of games. Among them, the achievement grade of "DEF baseball" is 100 percent, and a platinum trophy image 254, which indicates that the platinum trophy is acquired, is shown.

Figure 8:
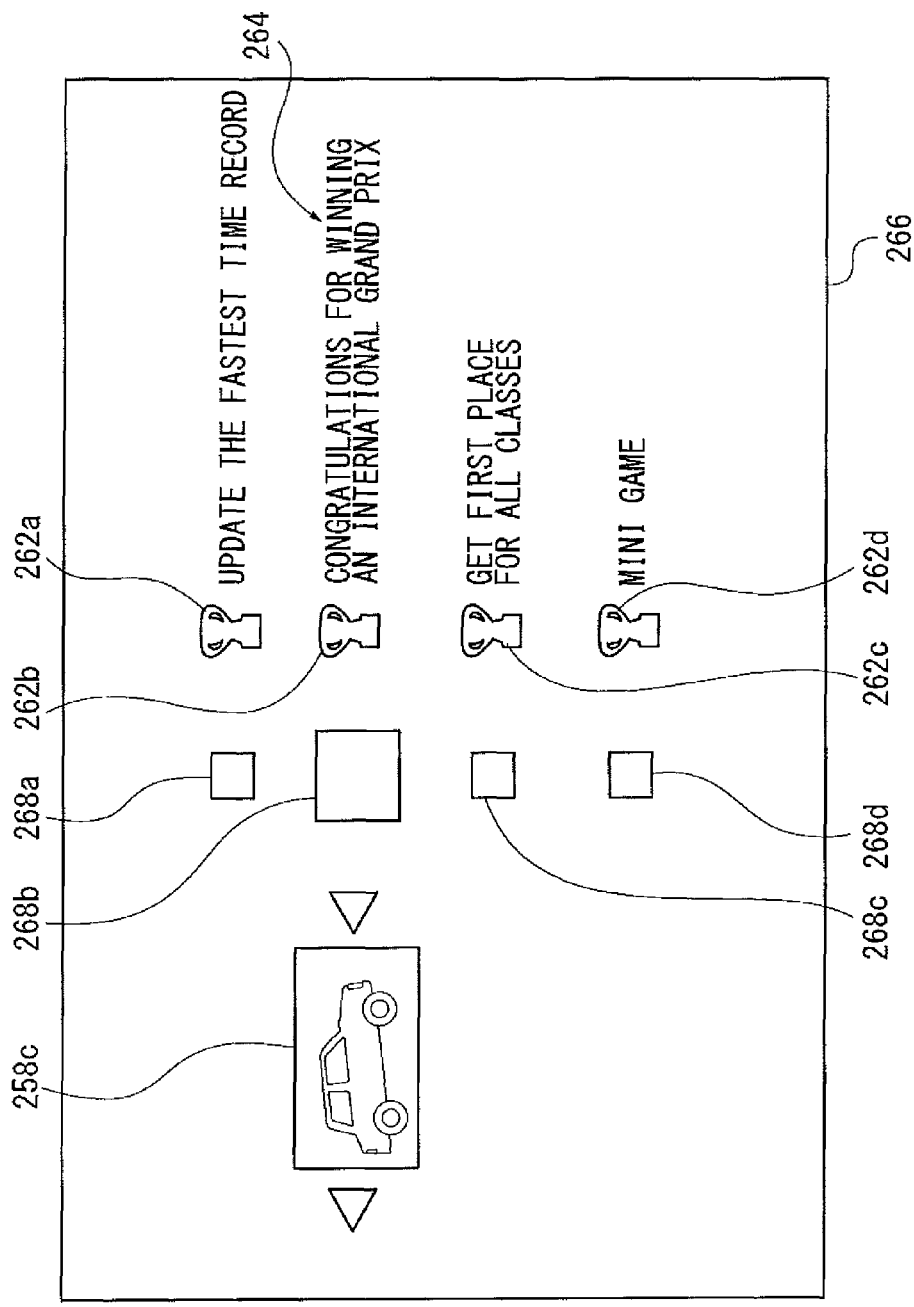
FIG. 8 shows an exemplary screen representing acquired trophies.

FIG. 8 shows an exemplary screen representing the acquired trophies. On the acquired trophy displaying screen 266, the acquired trophies are represented by trophy images 268a-268d and trophy images 262a-262d. The acquired trophy displaying screen 266 is generated by the display processing unit 230 after a user gives the instruction to display the detailed information screen by, for example, clicking on the icon image 258c.

On the acquired trophy displaying screen 266, the icon image displaying unit 232 disposes the icon image 258c, and the acquired item displaying unit 238 disposes the trophy images 268a-268d and the trophy images 262a-262d. The trophy images 268a-268d are icon images extracted from the item setting information 60, and the trophy images 262a-262d are images provided by the system software 200. The trophy images 268a-268d are colored, for example, with one of the colors included the set of bronze, silver, and gold. The acquired item displaying unit 238 extracts the item IDs of the trophies acquired by the user from the item acquisition information 70 of the game, the information 70 being shown as the icon image 258c. Then the acquired item displaying unit 238 acquires the trophy images 268 and explanation information 264 associated with those item IDs in the item setting information 60 and disposes, on the acquired trophy displaying screen 266, the images and information on the right side of the trophy images 262. This allows the user to know which trophy he/she has acquired so far, the type of the trophy, and the targets of the acquired missions from the information displayed on the acquired trophy displaying screen 266.

Figure 9:
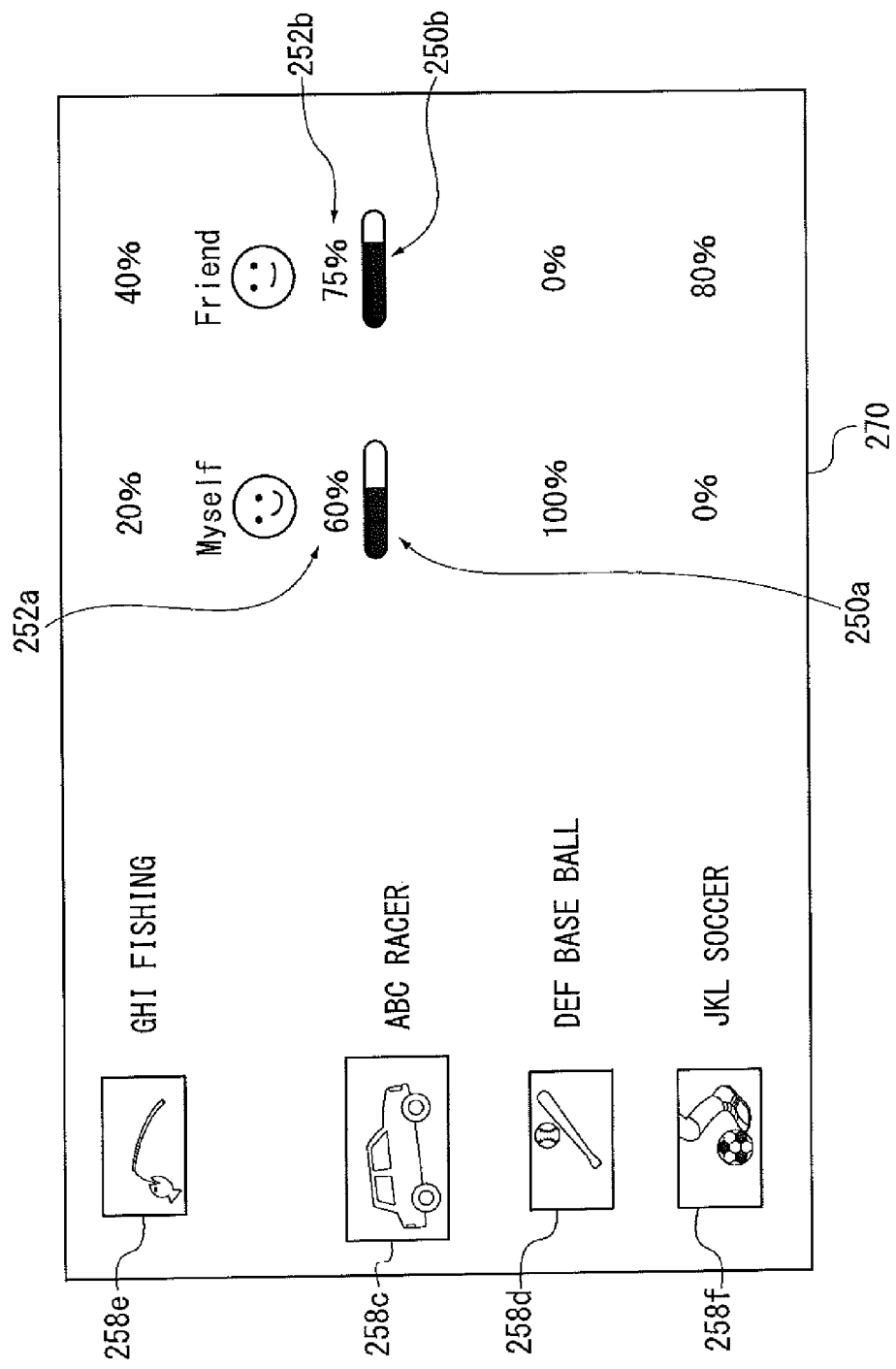
FIG. 9 shows an exemplary screen image where the achievement grade of the user himself/herself and that of another user are compared.

FIG. 9 shows an exemplary screen image where the achievement grade of the user himself/herself and that of another user are compared. On the achievement grade comparing screen 270, for the games of which either the user himself/herself or the other user has acquired an icon, the achievement grade deriving unit 220 derives the achievement grades, and the display processing unit 230 generates the achievement grade comparing screen 270.

The registration processing unit 402 acquires the item acquisition information 70 of a certain other user from the achievement grade managing server 18 via the communicating unit 404 and stores the information on the hard disk drive 34. The certain other user is a user for whom the network account ID is recorded in the game device 10. Accordingly, the registration processing unit 402 notifies the achievement grade managing server 18 of the account ID of the other user, and thus the registration processing unit 402 can acquire the item acquisition information 70. In this process, if the item acquisition information 70 of the certain other user includes information on a game that the game device 10 does not retain, the registration processing unit 402 also acquires the item setting information 60 on the game from the achievement grade managing server 18.

The item information acquiring unit 210 acquires the item setting information 60 and the item acquisition information 70 acquired from the achievement grade managing server 18 and provides the information to the achievement grade deriving unit 220. The achievement grade deriving unit 220 derives the achievement grades of the games for the user himself/herself and for the certain other user. For a game that a user has not played, the achievement grade is set to 0. The achievement grade information displaying unit 234 displays, in an array on the achievement grade comparing screen 270, the achievement grades of the games for the user himself/herself and for the certain other user. On the achievement grade comparing screen 270, for the icon image 258c, which is displayed in the focus region, the achievement grade indicators 250a and 250b are displayed for the user himself/herself and for the other user, respectively. Further, for the respective icon images 258, game titles are displayed and the achievement grade values 252 for the user himself/herself and for the other user are displayed, respectively.

On the achievement grade comparing screen 270 shown in FIG. 9, the achievement grade is displayed as 0 percent since the user himself/herself has not played "JKL soccer" or has not acquired any items in the game. In this fashion, even for a game with which the user himself/herself has not acquired any items, by displaying the title of the game and the achievement grade value 252 of another person, the user can see how far that person has played the game.

Figure 10:
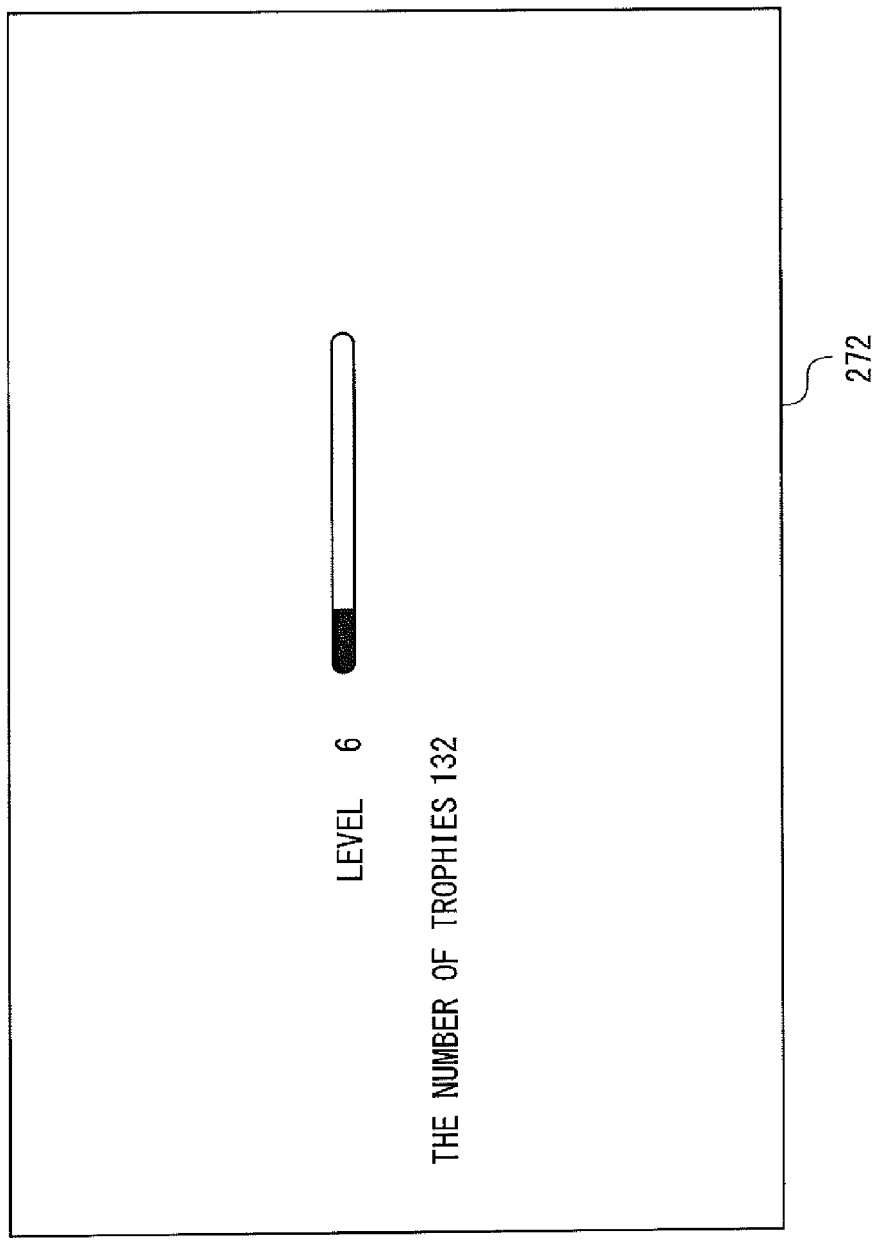
FIG. 10 shows an exemplary screen representing the level of a user.

FIG. 10 shows an exemplary screen representing the level of a user. In a level displaying screen 272, the level of the user and the number of trophies that the user has acquired so far are displayed in order to allow the user to check his or her level among all the users registered on the achievement grade managing system 1. The indicator in FIG. 10 represents the percentage of the acquired points at the present level, where 100 percent represents the number of points necessary to reach to the next level.

The level deriving unit 222 calculates the points by using the item acquisition information 70 and the item setting information 60 of all the games stored on the hard disk drive 34. Based on the calculated points, the level deriving unit 222 derives the level of the user. The process of calculating points for one game is performed in a similar fashion as the process that has been described relating to the achievement grade deriving unit 220. By executing this calculating process for all the games and by aggregation, the points acquired throughout all the games can be derived.

Starting at level 1, the level of a user increases as the acquired points increases. For example, in the case where 100 points makes a unit for one level, if the number of acquired points is 620, the level deriving unit 222 derives that the level is 6 and that the achievement grade at level 6 is 20 percent. The level deriving unit 222 transmits the derivation results to the level information displaying unit 236. On the level displaying screen 272, the level information displaying unit 236 displays "6" as the level value and displays the achievement grade "20 percent" at level 6 by using an indicator.

In FIG. 7, one example of the achievement grade indicator 250 is shown. In the case that the item setting information 60 is updated and that a trophy is newly added, the point total increases. In this case, calculating the total points while adding the points for the newly added trophy makes the achievement grade decrease compared to the achievement grade prior to the item setting information 60 being updated. Therefore, the achievement grade deriving unit 220 calculates the total points for calculating the achievement grade only from the default item setting information 60 and does not include the points for the newly added trophy. Thus, if a user who has an achievement grade of 100 percent acquires a newly added trophy, the achievement grade surpasses 100 percent.

Figure 11A:
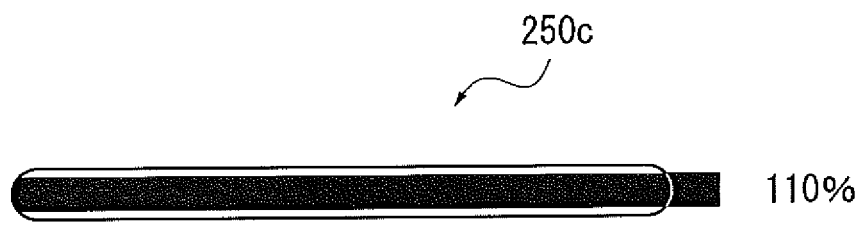
FIG. 11A shows an achievement grade indicator representing 110 percent by extending beyond the 100 percent region.

FIG. 11A shows an achievement grade indicator 250c representing 110 percent by extending beyond the 100 percent region. The achievement grade indicator 250c is displayed as surpassing the border that indicates 100 percent. In this case, it is preferable to display it so that the region indicating 100 percent is perceivable by, for example, rendering the frame of the indicator with a color different from that of the indicator itself, etc.

Figure 11B:
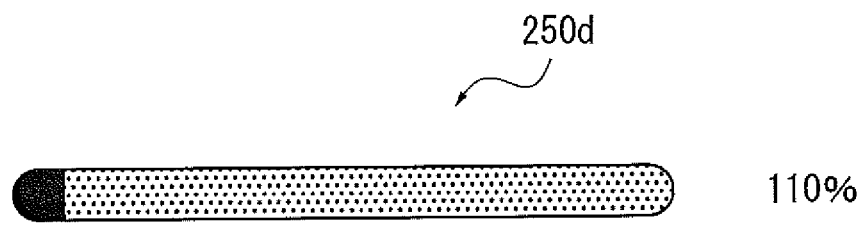
FIG. 11B shows an variation of the achievement grade indicator.

FIG. 11B shows an achievement grade indicator 250d representing 110 percent by folding back a part of the indicator that surpasses the 100 percent region. The achievement grade indicator 250d exhibits 110 percent by using the region between 0 percent and 10 percent. The representation using the folding expression allows for the expression of a value of more than 100 percent in the frame of the indicator.

<Handling of Save Data>

As described above, in the achievement grade managing system 1 according to the present exemplary embodiment, the game device 10 acquires trophies, and the result of the acquisition is effectively displayed. By collecting a lot of trophies, a user can improve the achievement grade for a game and can improve the level. Thus, in the achievement grade managing system 1, the equality among users should be maintained, and it becomes necessary to restrict the fraudulent collection of trophies. Therefore, the game device 10 prohibits, as one of the measures to maintain fairness, users from acquiring a trophy using the save data of another user.

In the game device 10, when the process of saving or loading save data is performed, the game software 300 calls a save data utility function for executing the process of saving or loading. The save data utility function constitutes an API processing module for saving and an API processing module for loading.

In the present exemplary embodiment, the saving API processing module has the functional capability of adding the ID information of a user to game data and saving the game data on the hard disk drive 34, accordingly. The loading API processing module has the functional capability of extracting additional information of the save data when loading the save data from the hard disk drive 34. The loading API processing module passes the extracted additional information to the item management utility 400.

Figure 12:
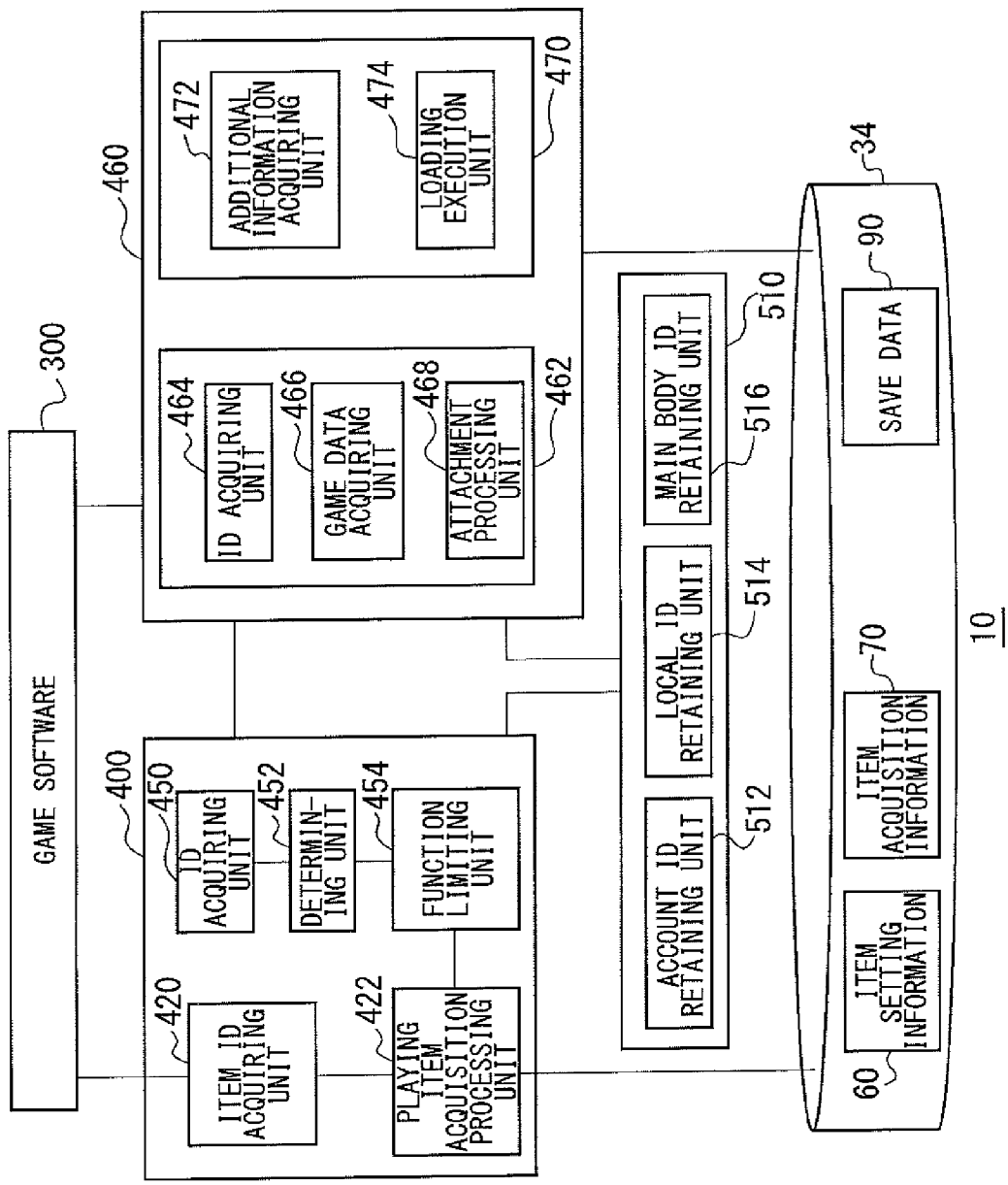
FIG. 12 shows a game device comprising a save data utility.

FIG. 12 shows the game device 10 comprising a save data utility 460. A saving API processing module 462 functions as a saving processor and is configured by allowing the game software 300 to call a save data utility function for saving data. The saving API processing module 462 is provided with an ID acquiring unit 464, a game data acquiring unit 466, and an attachment processing unit 468.

The ID acquiring unit 464 acquires ID information to be attached to the save data. Flash memory 510 is provided with an account ID retaining unit 512, a local ID retaining unit 514, and a main body ID retaining unit 516. The account ID retaining unit 512 retains the account IDs used in a network. The account ID is given when a user is registered in the achievement grade managing server 18. Thus, if a user has not been registered, blank data is written into the account ID retaining unit 512. In this case, the user cannot access the achievement grade managing server 18. The local ID retaining unit 514 retains local IDs that users have set locally on the game device 10. The main body ID retaining unit 516 retains the ID of the main body of the game device 10.

If the account ID retaining unit 512 retains an account ID, the ID acquiring unit 464 acquires the account ID, and if the account ID retaining unit 512 does not retain an account ID, the ID acquiring unit 464 acquires the local ID and the main body ID. Hereinafter, the account ID or the combination of the local ID and the main body ID is collectively referred to as user ID information. The game data acquiring unit 466 acquires from the game software 300 game data to be saved, such as the processing result of an application, or the like. The attachment processing unit 468 attaches the user ID information acquired by the ID acquiring unit 464 to the game data acquired by the game data acquiring unit 466 as attached information and stores the game data on the hard disk drive 34. This allows the save data 90 to be stored as game data with attached information.

The user ID information attached by the attachment processing unit 468 when game data is first saved is treated as a creator ID. The creator ID retains its status when it was added even when the save data is afterwards loaded, executed, and saved. For example, in case a user different from the user who first created the save data plays the game while using the save data and saves the game data, the creator ID remains attached to the save data and is not rewritten. In this process, only the creator ID may be attached to the save data, and the ID of a user who is different from the creator may not be attached. That is, in case the game data to be saved is game data executed by the application executing unit 302 while using the loaded save data, the saving API processing module 462 attaches the user ID information that is attached to the loaded save data to the game data and saves the game data on the hard disk drive 34, accordingly. In this process, both of the creator ID and the ID information of a user different from the creator may be attached to the save data.

A loading API processing module 470 functions as a loading processor and is configured by allowing the game software 300 to call the save data utility function for loading data. The loading API processing module 470 comprises an additional information acquiring unit 472 and a loading execution unit 474.

Before loading the save data 90, the additional information acquiring unit 472 acquires the creator ID from the save data 90 stored on the hard disk drive 34. The additional information acquiring unit 472 passes the acquired creator ID to a determining unit 452 of the item management utility 400.

Subsequently, the loading execution unit 474 loads the save data 90 from the hard disk drive 34.

In the item management utility 400, an ID acquiring unit 450 acquires, from the flash memory 510, the user ID information of a user who is playing the game at the present moment. If the account ID is retained in the account ID retaining unit 512, the ID acquiring unit 450 acquires the account ID, and if the account ID is not stored, the ID acquiring unit 450 acquires the local ID and the main body ID and passes the IDs to the determining unit 452. The determining unit 452 determines whether or not the creator ID provided from the additional information acquiring unit 472 and the user ID information acquired by the ID acquiring unit 450 correspond to each other. A determination on the correspondence is basically executed based on whether or not the IDs perfectly match. Therefore, in case both the creator ID and the user ID information acquired by the ID acquiring unit 450 include a local ID and a main body ID, the determination on the correspondence is made depending on whether or not both of the IDs match.

In case the creator ID and the user ID information acquired by the ID acquiring unit 450 do not correspond to one another, the determining unit 452 determines that an error has occurred and notifies the function limiting unit 454, accordingly. Upon being notified of the error determination, the function limiting unit 454 puts restriction on the functional capability of the playing item acquisition processing unit 422. Therefore, even in the case where the game software 300 determines that a mission is completed and transmits a corresponding ID to the item management utility 400 and where the item ID acquiring unit 420 acquires the item ID, the playing item acquisition processing unit 422 does not execute the process of acquiring an item. This allows the game device 10 to prohibit the acquisition of a trophy in case a user different from the user who has first created the save data plays the game while using the save data. This enables the prohibition of a situation where the save data that is saved right before acquiring a rare trophy is distributed and where a user who does not actually play the game acquires the trophy.

Since the user has completed a mission in the game and thus recognizes that he/she has received a trophy, the system software 200 preferably notifies the user that the trophy has not been acquired. More specifically, at the time when the item ID acquiring unit 420 acquires an item ID and the function limiting unit 454 limits the functionality of the playing item acquisition processing unit 422, the function limiting unit 454 issues an instruction for generating a message to the message generating unit 204 (shown in FIG. 4) in the system software 200. Upon receiving the instruction, the message generating unit 204 generates a message expressing that a trophy could not been obtained, and then the message displaying unit 240 displays the message so that the message overlaps a predetermined region on the game screen. This allows a user who is playing the game to recognize that he/she could not obtain a trophy. This message may be displayed when the save data 90 is loaded. Alternatively, the loading API processing module 470 may be provided with the functional capability of the determining unit 452. In this case, if the ID of a user who owns the save data 90 and the ID of a user who desires to load the save data 90 do not correspond to one another, the determining unit 452 may issue the instruction for generating the message to the message generating unit 204.

An explanation is given above on a scheme where the acquisition of trophies by a user is prohibited in case the ID of a user who owns the save data 90 and the ID of a user who loads the save data 90 do not correspond to one another. However, the function limiting unit 454 may be turned off so as not to operate and so as to allow a user to acquire a trophy depending on the type of save data 90 to be loaded.

As for the save data 90, there are a variety of types of data, such as, data that saves the progress of the game, data that relates to characters appearing in the game, data that relates to a new stage (story) of the game, or the like. These types of data are distinguished, for example, by the extension of the file name. In the case where the data that saves the progress of the game is loaded, it is preferable to prohibit a user from acquiring a trophy as described above. Meanwhile, in the case where the data on characters or the data relating to new story is loaded, it may be configured so that a user is allowed to acquire a trophy. Further, it is also possible to set the loading of a new character as one of the requirements for acquiring a trophy.

Therefore, in the game software 300, the application executing unit 302 identifies the type of save data 90 from the extension of the save data 90, for example when the save data 90 is loaded by the loading execution unit 474 or before the save data 90 is loaded. Alternatively, since the application executing unit 302 can perceive the type of save data 90 when specifying the save data 90 to be loaded, the application executing unit 302 identifies the type of the save data 90. Therefore, when loading the save data 90 on new character, the game software 300 may stop the operation of the function limiting unit 454, which limits the functional capability of the playing item acquisition processing unit 422. In this manner, by turning off the limiting function of the function limiting unit 454, for example, in a game where users exchange characters each other among friends, the situation where trophies cannot be acquired when playing the game after the exchange can be avoided. This allows users to exchange characters proactively.

Figure 13:
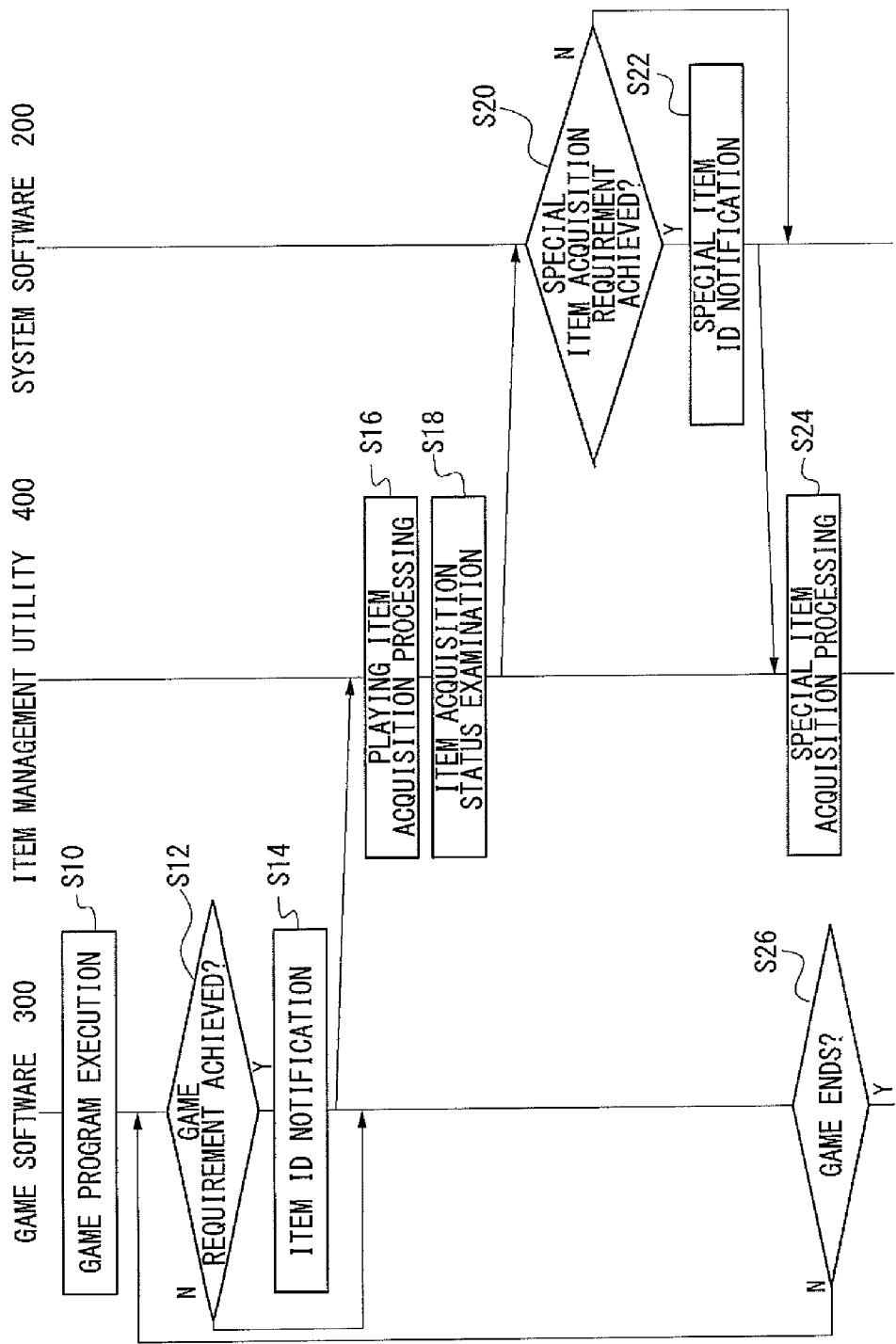
FIG. 13 is a flowchart showing the process of acquiring an item.

FIG. 13 is a flowchart showing the process of acquiring an item. In the game software 300, the application executing unit 302 receives an operation input from a user via the game controller 40 and then executes a game program (S10). The game requirement achievement-determining unit 304 monitors the progress status of the game and determines whether or not a pre-set requirement of gameplay is achieved (S12). If the game requirement achievement-determining unit 304 determines that a mission is completed (Y in S12), the game requirement achievement-determining unit 304 acquires from the mission table an item ID associated with the completed mission. The item ID notifying unit 306 notifies the item management utility 400 of the acquired item ID (S14). If the requirement of gameplay is not achieved (N in S12), the item ID is not conveyed.

In the item management utility 400, the item ID acquiring unit 420 acquires the conveyed item ID and passes the ID to the playing item acquisition processing unit 422. The playing item acquisition processing unit 422 generates the item acquisition information 70 while using the item ID and executes the process of acquiring an item (S16). In this process, the item acquisition status examining unit 414 refers to both the item setting information 60 and the item acquisition information 70 and examines the status of acquisition of items and notifies the special item acquisition determining unit 202 in the system software 200 (S18).

The special item acquisition determining unit 202 determines, based on the examination results by the item acquisition status examining unit 414, whether or not an item acquisition requirement necessary for acquiring a special item is achieved (S20). More specifically, if there is an item having "1" as the platinum flag value and the item has not been acquired, the special item acquisition determining unit 202 determines that the item acquisition requirement is not achieved (N in S20). On the other hand, if all the items having "1" as the platinum flag value have been acquired, the special item acquisition determining unit 202 determines that the item acquisition requirement is achieved (Y in S20). In this process, the special item acquisition determining unit 202 notifies the item management utility 400 of the item ID of the special item (S22), and the special item acquisition processing unit 412 generates the item acquisition information 70 while using the item ID (S24). This process for acquiring an item is executed until the game ends (N in S26), and when the game ends (Y in S26), the process of acquiring an item ends.

Figure 14:
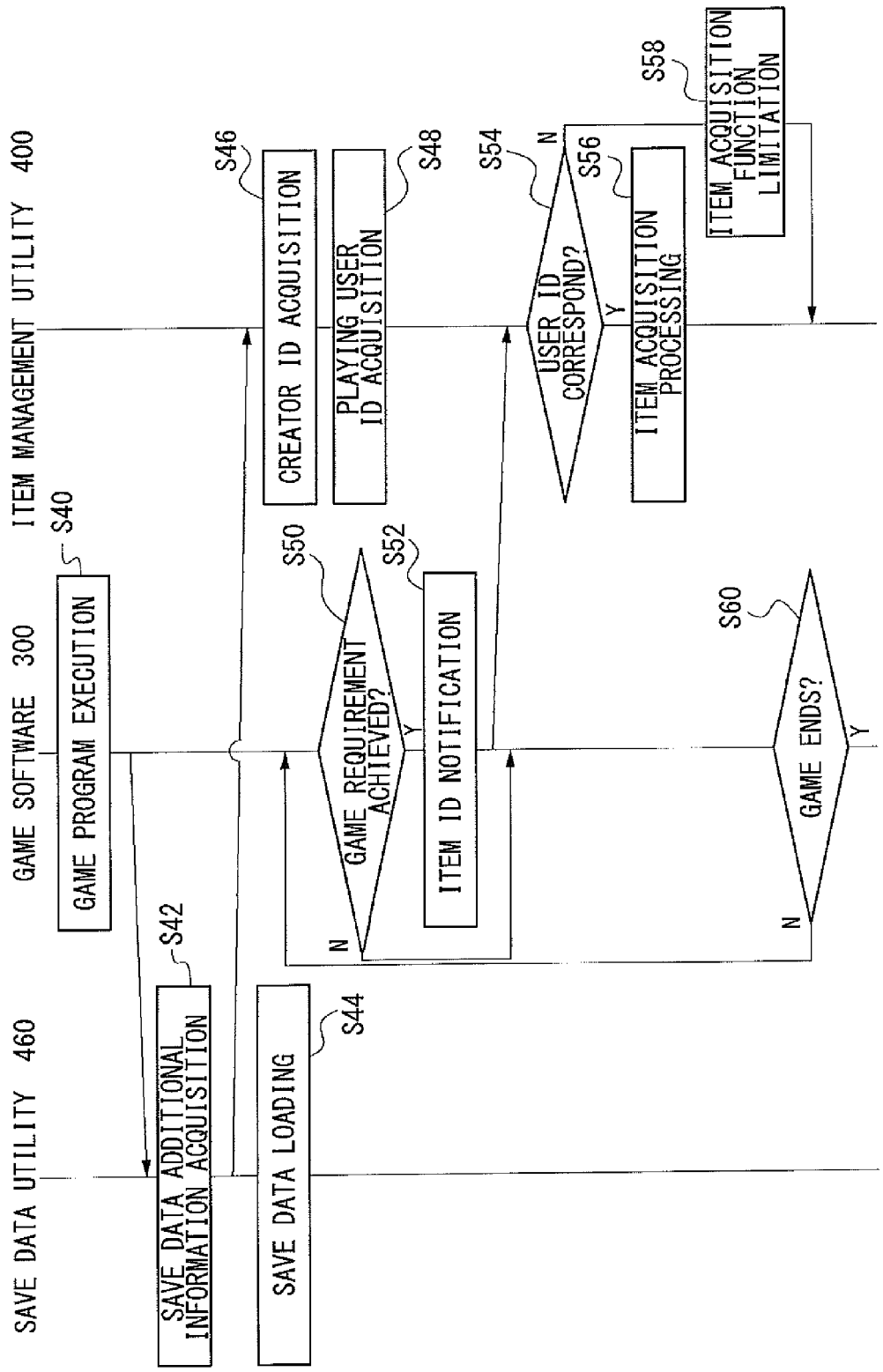
FIG. 14 is a flowchart showing the process for acquiring an item while using save data.

FIG. 14 is a flowchart showing the process for acquiring an item while using save data. In the game software 300, the application executing unit 302 executes a game program (S40) and gives the save data utility 460 an instruction for executing the process of loading the save data.

In the save data utility 460, the additional information acquiring unit 472 acquires a creator ID from the save data 90 stored on the hard disk drive 34 before loading the save data 90 (S42). The additional information acquiring unit 472 passes the acquired creator ID to the item management utility 400. Subsequently, the loading execution unit 474 loads the save data 90 from the hard disk drive 34 (S44).

In the item management utility 400, the creator ID of the save data 90 is acquired from the save data utility 460 (S46), and the user ID information on the user who is playing the game at the present moment from the flash memory 510 (S48).

The game software 300 forwards the progression of the game program by using the loaded save data. The game requirement achievement-determining unit 304 monitors the status of progression of the game and determines whether or not the requirement of gameplay that is pre-set for the game is achieved (S50). If the game requirement achievement-determining unit 304 determines that a mission is completed (Y in S50), the game requirement achievement-determining unit 304 acquires an item ID associated with the achieved mission according to the mission table. The item ID notifying unit 306 notifies the item management utility 400 of the acquired item ID (S52). If the requirement of gameplay is not achieved (N in S50), the item ID is not conveyed.

In the item management utility 400, the determining unit 452 determines whether or not the creator ID and the user ID information of the present player correspond to one another (S54). If the IDs correspond to each other (Y in S54), the playing item acquisition processing unit 422 generates the item acquisition information 70 using the item ID and executes the process of acquiring an item, (S56). On the other hand, if the creator ID and the user ID information of the present player do not correspond to one another (N in S54), the function limiting unit 454 limits the functionality of the playing item acquisition processing unit 422 (S58). Therefore, even in the case where the game software 300 determines that the mission is completed and transmits the corresponding item ID to the item management utility 400 and where the item ID acquiring unit 420 acquires the item ID, the playing item acquisition processing unit 422 does not to execute the process of acquiring items.

Given above is an explanation based on an exemplary embodiment. This embodiment is intended to be illustrative only, and it will be obvious to those skilled in the art that various modifications to constituting elements and processes could be developed and that such modifications are also within the scope of the present invention.

In the exemplary embodiment, the user level displayed on the level displaying screen 272 illustrated in FIG. 10 is derived by the level deriving unit 222 in the system software 200. However, the functionality of the level deriving unit 222 may be implemented by the controller 500 in the achievement grade managing server 18. Since the achievement grade managing server 18 retains the latest item acquisition information 70 by synchronizing with the game device 10, the controller 500 can derive the user level for each user and the number of trophies each user has acquired so far. Therefore, the controller 500 can calculate the level of each user by calculating points by using the game item acquisition information 70 for each user and the item setting information 60 on the games where each user had acquired a trophy, the item acquisition information 70, and the item setting information 60 being stored in the storage device 80. By allowing the achievement grade managing server 18 to retain the functional capability for deriving the levels, statistical processing can also be performed, for example, for the creation of the distribution of the users for their respective levels. Thus, there is the advantage that the respective users can easily grasp their relative level.

Further, in the exemplary embodiment, each trophy has a platinum flag value as a platinum link attribution, and the platinum flag value of "1" represents the acquisition of that trophy being included in the requirements for acquiring a platinum trophy. In the exemplary embodiment, only one platinum trophy is the item that the system software 200 gives to users. In a variation of the exemplary embodiment illustrated below, a scheme is provided where the system software 200 can give a user a plurality if items (platinum trophies). For example, the system software 200 grants a user the first platinum trophy, the second platinum trophy, and the third platinum trophy, being identified by item ID 100, item ID 101, and item ID 102, respectively. Hereinafter, item ID 100, item ID 101, and item ID 102 are referred to as platinum IDs.

In this case, each of the trophies of the bronze, the silver, and the gold have, as a platinum link attribute, a platinum specifying ID value. The acquisition of a trophy may be included in the requirements for acquiring one of the platinum trophies, and the platinum specifying ID value represents which of the platinum trophies is to be acquired. More specifically, if the item ID 100 is set as the platinum link attribute of a certain trophy, the acquisition of that trophy is included in the requirements for acquiring the first platinum trophy. In a similar manner, if the item ID 101 is set as the platinum link attribute of a trophy, the acquisition of that trophy is included in the requirements for acquiring the second platinum trophy, and if the item ID 102 is set as the platinum link attribute of a trophy, the acquisition of that trophy is included in the requirement for acquiring the third platinum trophy.

In this case, the playing item acquisition processing unit 422 executes the process of acquiring an item, and then the special item acquisition determining unit 202 allows the item acquisition status examining unit 414 to examine the acquisition status of items. The item acquisition status examining unit 414 refers to the item setting information 60 and extracts an item ID of which the platinum link attribute value (hereinafter referred to as platinum identification ID value) is set to either the platinum ID 100, platinum ID 101, or platinum ID 102 while sorting out the respective platinum IDs. Subsequently, the item acquisition status examining unit 414 refers to the trophy acquisition table and examines, for each platinum ID, whether the acquisition flag values for each of the extracted item IDs are "1".

If the acquisition flag value for each of the item IDs extracted for one of the platinum IDs is "1", the item acquisition status examining unit 414 notifies the special item acquisition determining unit 202 of the examination result.

The special item acquisition determining unit 202 determines that the requirement for acquiring an item for that platinum ID is achieved.

In case the requirement for acquiring a platinum trophy is achieved, the special item acquisition determining unit 202 notifies the item ID acquiring unit 418 of the item ID of the platinum trophy. For example, if the requirement for acquiring the first platinum trophy is achieved, the special item acquisition determining unit 202 notifies the item ID acquiring unit 418 of the platinum ID 100. The item ID acquiring unit 418 acquires the obtained platinum ID and passes the ID to the special item acquisition processing unit 412. The special item acquisition processing unit 412 generates the item acquisition information 70 by using the platinum ID. More specifically, the special item acquisition processing unit 412 sets the acquisition flag value of the item ID 100 to "1" in the trophy acquisition table. In this manner, even if there is a plurality of platinum trophies, the acquisition process can be performed while distinguishing each platinum trophy.

The acquisition of a special item may be set as one of the requirements for acquiring another special item. In the example described above, each of the bronze, silver, and gold trophies has, as a platinum link attribute, a platinum specifying ID value of the item ID 100 or the item ID 101. The platinum specifying ID value retained by each of the bronze, the silver, and the gold trophies is utilized as a requirement for acquiring the first platinum trophy or the second platinum trophy. Further, the first platinum trophy and the second platinum trophy may be provided with, as a platinum link attribute, the platinum specifying ID value of the item ID 102. In this fashion, the acquisition of both the first platinum trophy and the second platinum trophy may be set as a requirement for acquiring the third platinum trophy.

In this case, the special item acquisition processing unit 412 executes the process of acquiring a platinum item, and then the special item acquisition determining unit 202 allows the item acquisition status examining unit 414 to examine the acquisition status of items. The item acquisition status examining unit 414 refers to the item setting information 60 and extracts an item ID (in this case, item ID 101 or item ID 102) of which the platinum link attribute value (hereinafter referred to as platinum identification ID value) is set to platinum ID 102. Subsequently, the item acquisition status examining unit 414 refers to the trophy acquisition table and examines whether the acquisition flag value for each of the extracted item IDs is "1". If the acquisition flag value for each the item IDs (item ID 101 and item ID 102) is "1", the item acquisition status examining unit 414 notifies the special item acquisition determining unit 202 of the examination result. The special item acquisition determining unit 202 determines that the item acquisition requirement for the third platinum ID is achieved. This allows the special item acquisition processing unit 412 to perform the process of acquiring the third platinum trophy.

Above, the attribute of the "platinum link" is utilized as a requirement for acquiring a platinum trophy. However, this attribute may be set for another type of trophy. For example, this attribute value may be used as a requirement for acquiring a predetermined gold trophy or may be used as a requirement for acquiring a predetermined silver trophy. In these cases, the predetermined gold and silver trophies are treated as special items. As described above, the acquisition of the gold trophy and the silver trophy, which are special items, may be utilized as a requirement for acquiring another special item (e.g., a platinum trophy).

DESCRIPTION OF THE REFERENCE NUMERALS

1 . . . achievement grade managing system, 10 . . . game device, 12 . . . display device, 18 . . . achievement grade managing server, 34 . . . hard disk drive, 40 . . . game controller, 60 . . . item setting information, 70 . . . item acquisition information, 80 . . . storage device 80, 90 . . . save data, 200 . . . system software, 202 . . . special item acquisition determining unit, 204 . . . message generating unit, 210 . . . item information acquiring unit, 212 . . . item setting information acquiring unit, 214 . . . item acquisition information acquiring unit, 220 . . . achievement grade deriving unit, 222 . . . level deriving unit, 230 . . . display processing unit, 232 . . . icon image displaying unit, 234 . . . achievement grade information displaying unit, 236 . . . level information displaying unit, 238 . . . acquired item displaying unit, 240 . . . message displaying unit, 300 . . . game software, 302 . . . application executing unit, 304 . . . game requirement achievement-determining unit, 306 . . . item ID notifying unit, 400 . . . item management utility, 402 . . . registration processing unit, 404 . . . communicating unit, 406 . . . item information providing unit, 410 . . . special item processing unit, 412 . . . special item acquisition processing unit, 414 . . . item acquisition status examining unit, 416 . . . special item ID notifying unit, 418 . . . item ID acquiring unit, 420 . . . item ID acquiring unit, 422 . . . playing item acquisition processing unit, 450 . . . ID acquiring unit, 452 . . . determining unit, 454 . . . function limiting unit, 460 . . . save data utility, 462 . . . saving API processing module, 464 . . . ID acquiring unit, 466 . . . game data acquiring unit, 468 . . . attachment processing unit, 470 . . . loading API processing module, 472 . . . additional information acquiring unit, 474 . . . loading execution unit, 500 . . . controller, 510 . . . flash memory 510, 512 . . . account ID retaining unit, 514 . . . local ID retaining unit, 516 . . . main body ID retaining unit.

The present invention is preferably applied to the field of gaming.

What is claimed is:
1. A game device, comprising:
an application executing unit operative to execute a game program;
a game requirement achievement determining unit operative in response to the game program to determine whether or not a predetermined requirement of gameplay that is established by the game program, is achieved based on a progress status of the game;
a playing item acquisition processing unit operative to generate item acquisition information on a playing item by using an item ID associated with the achieved requirement of gameplay;
an item acquisition status examining unit operative to examine an acquisition status of playing items;
a special item acquisition determining unit operative under the control of a system software program to determine whether or not a requirement for acquiring a special item that is established by the system software program, which is different from the playing item and which is not one of the predetermined requirements of gameplay established by the game program, is achieved based on the examination result by the item acquisition status examining unit;
a special item acquisition processing unit operative to generate item acquisition information on the special item by using an item ID associated with the special item in case the requirement for acquiring a special item is achieved, where the special item acquisition processing unit is not associated with the predetermined requirement of gameplay; and a storage device operative to store the generated item acquisition information.

2. The game device according to claim 1, wherein the storage device stores item setting information that associates an item ID and the type of the playing item with each other, wherein points are set for each type of playing item, further comprising:

an item acquisition information acquiring unit operative to acquire the item acquisition information from the storage device;

an item setting information acquiring unit operative to acquire the item setting information from the storage device;

an achievement grade deriving unit operative to calculate points by using the item acquisition information and the item setting information and to derive an achievement grade of the game based on the calculated points; and an achievement grade information displaying unit operative to display the derived achievement grade on a display device.

3. The game device according to claim 2, wherein:
the achievement grade deriving unit derives achievement grades for a plurality of games, and
the achievement grade information displaying unit displays the derived achievement grades for a plurality of games on the display device.

4. The game device according to claim 3, further comprising a registration processing unit operative to acquire item acquisition information of another user from a server connected via a network and operative to store the information into the storage device, wherein:
the achievement grade deriving unit derives achievement grades for a plurality of users, and
the achievement grade information displaying unit displays achievement grades for a plurality of users in an array on the display device.

5. The game device according to claim 2, further comprising a level deriving unit operative to calculate points by using the item acquisition information and the item setting information for all the games stored in the storage device and operative to derive a user level based on the calculated points.

6. The game device according to claim 1, further comprising a message generating unit operative to generate a message relating to the acquisition of the special item in order to display, in case the requirement for acquiring the special item is achieved, the message at a predetermined region on the game screen of the game being executed.

7. The game device according to claim 1, further comprising:
a loading processor operative to load save data, on which user ID information is attached, from the storage device;
an item ID acquiring unit operative to acquire an item ID associated with the achieved requirement of gameplay; and
a function limiting unit operative to limit the function of the playing item acquisition processing unit in accordance with the user ID information attached to the save data; wherein
the application executing unit executes the game program by using the loaded save data; and
the playing item acquisition processing unit has a function for generating item acquisition information by using the item ID acquired by the item ID acquiring unit.

8. The game device according to claim 7, further comprising:
a user ID acquiring unit operative to acquire user ID information of a user who is playing a game; and
a determining unit operative to determine the correspondence between the user ID information attached to the save data and the user ID information acquired by the user ID acquiring unit, wherein
in case the determining unit determines that the user ID information attached to the save data and the user ID information acquired by the user ID acquiring unit do not correspond to each other, the function limiting unit limits a function of the playing item acquisition processing unit.

9. The game device according to claim 7, further comprising
a saving processor operative to save game data relating to the progress of a game,
wherein in case that the game data is game data executed by the application executing unit using the loaded save data, the saving processor attaches the user ID information attached to the loaded save data to the game data and saves the data in the storage device, accordingly.

10. The game device according to claim 1, wherein:
each playing item includes attribute information indicating whether acquisition of the playing item is included in an item acquisition requirement for acquiring the special item,
the item acquisition status examining unit examines whether all of the playing items each including the attribute information indicating inclusion in the item acquisition requirement for acquiring the special item have been acquired, and
the special item acquisition determining unit determines that the item acquisition requirement is achieved if all of the playing items including the attribute information indicating inclusion in the item acquisition requirement for acquiring the special item have been acquired.

11. A non-transitory, computer readable recording medium having recorded thereon a program, the program adapted to cause a computer to perform, when executed, the following functions:
executing a game program;
determining in response to the game program whether or not a predetermined requirement of gameplay that is established by the game program, is achieved based on a progress status of the game;
generating item acquisition information on a playing item by using an item ID associated with the achieved requirement of gameplay;
examining the acquisition status of playing items;
determining under the control of a system software program whether or not a requirement for acquiring a special item that is established by the system software program, which is different from the playing item and which is not one of the predetermined requirements of gameplay established by the game program, is achieved based on the examination result;
generating item acquisition information on the special item by using an item ID associated with the special item in case the requirement for acquiring the special item is achieved, where the generation of the item acquisition information is not associated with the predetermined requirement of gameplay; and
storing the generated item acquisition information in a storage device.

12. The computer readable recording medium according to claim 11, having recorded thereon the program, the program adapted to cause a computer to perform, when executed, the following functions:

loading save data, on which user ID information is attached, from the storage device;

acquiring an item ID associated with the achieved requirement of gameplay; and limiting, in accordance with the user ID information attached to the save data, a function of the generating module from generating item acquisition information, wherein the executing function includes a function of executing the game program by using the loaded save data; and the generating function includes a function of generating item acquisition information by using the acquired item ID.

* * * * *